(12) United States Patent
Digel et al.

(10) Patent No.: US 12,276,132 B2
(45) Date of Patent: Apr. 15, 2025

(54) STRIKER ASSEMBLY FOR CLOSURE LATCH IN MOTOR VEHICLES

(71) Applicant: Magna BOCO GmbH, Wuppertal (DE)

(72) Inventors: Michael Digel, Wuppertal (DE); Florian Scheffler, Wuppertal (DE)

(73) Assignee: Magna BOCO GmbH, Wuppertal (DE)

(*) Notice: Subject to any disclaimer, the term of this patent is extended or adjusted under 35 U.S.C. 154(b) by 530 days.

(21) Appl. No.: 17/168,159

(22) Filed: Feb. 4, 2021

(65) Prior Publication Data
US 2021/0246687 A1 Aug. 12, 2021

Related U.S. Application Data

(60) Provisional application No. 62/991,633, filed on Mar. 19, 2020, provisional application No. 62/971,138, filed on Feb. 6, 2020.

(51) Int. Cl.
*E05B 77/34* (2014.01)
*B62D 25/12* (2006.01)
(Continued)

(52) U.S. Cl.
CPC ............ *E05B 15/022* (2013.01); *B62D 25/12* (2013.01); *E05B 77/10* (2013.01); *E05B 83/24* (2013.01)

(58) Field of Classification Search
CPC ........ E05B 15/022; E05B 77/10; E05B 83/24; E05B 17/0004; E05B 85/045;
(Continued)

(56) References Cited

U.S. PATENT DOCUMENTS 6,042,160 A * 3/2000 Hamada ................ E05B 85/045
292/216
6,666,487 B2 12/2003 Oxley et al.
(Continued)

FOREIGN PATENT DOCUMENTS

AT 519051 B1 6/2018
CA 2168118 C 2/2006
(Continued)

*Primary Examiner* — Michael P Ferguson
*Assistant Examiner* — Thomas L Neubauer
(74) *Attorney, Agent, or Firm* — Dickinson Wright PLLC

(57) ABSTRACT

A striker assembly for a vehicle closure panel includes a striker plate and a striker. The striker plate has opposite sides with at least one opening. A body of the striker extends through the at least one opening outwardly from the opposite sides to opposite first and second end regions, the second end region being configured for latched engagement with a ratchet of a latch assembly. The body is releasably fixed in a first position relative to the striker plate during normal use conditions resulting in normal use forces being applied to the striker. The body is intentionally deformable under an abnormal condition resulting in abnormal, excessively high force being applied to the striker to allow the striker to automatically move relative to the striker plate from the first position to a second position to allow a vehicle closure panel to move outwardly relative to an adjacent vehicle body structure.

16 Claims, 17 Drawing Sheets

(51) Int. Cl.
  *E05B 15/02*  (2006.01)
  *E05B 77/10*  (2014.01)
  *E05B 81/06*  (2014.01)
  *E05B 81/14*  (2014.01)
  *E05B 83/24*  (2014.01)

(58) Field of Classification Search
  CPC ......... E05B 77/38; E05B 85/00; E05B 77/12; E05B 85/04; B62D 25/12
  See application file for complete search history.

(56) References Cited

U.S. PATENT DOCUMENTS

| | | | |
|---|---|---|---|
| 6,715,808 B2 * | 4/2004 | Oxley | ............... E05B 81/22 292/144 |
| 7,073,846 B2 | 7/2006 | Borg et al. | |
| 7,275,774 B2 | 10/2007 | Oberheide | |
| 7,828,348 B2 | 11/2010 | Bolbocianu et al. | |
| 9,476,233 B2 | 10/2016 | Uyanik et al. | |
| 2006/0055179 A1 * | 3/2006 | Burton | ............... E05B 83/24 292/216 |
| 2006/0175844 A1 | 8/2006 | Neal et al. | |
| 2012/0306237 A1 * | 12/2012 | Farooq | ............... E05B 83/24 296/193.11 |
| 2016/0076279 A1 | 3/2016 | Ilea et al. | |
| 2017/0282780 A1 | 10/2017 | Wagner et al. | |
| 2020/0040622 A1 | 2/2020 | Digel | |
| 2020/0299994 A1 | 9/2020 | Paskonis | |

FOREIGN PATENT DOCUMENTS

| | | | |
|---|---|---|---|
| CA | 2186436 C | 6/2008 | |
| CN | 206049811 U | 3/2017 | |
| CN | 108825009 A | 11/2018 | |
| CN | 108930465 A | 12/2018 | |
| CN | 209581636 U | 11/2019 | |
| CN | 209620921 U | 11/2019 | |
| CN | 112277871 A | 1/2021 | |
| CN | 113969708 A | 1/2022 | |
| DE | 10143939 A1 | 4/2003 | |
| DE | 10152621 A1 | 5/2003 | |
| DE | 10204594 A1 | 8/2003 | |
| DE | 10214602 A1 | 10/2003 | |
| DE | 10252748 A1 | 5/2004 | |
| DE | 10325640 A1 | 8/2004 | |
| DE | 10322356 A1 | 12/2004 | |
| DE | 10323150 A1 | 12/2004 | |
| DE | 10327973 B4 | 4/2006 | |
| DE | 102005034098 A1 * | 1/2007 | ............. B60R 21/38 |
| DE | 102006012090 B3 | 10/2007 | |
| DE | 102009037357 A1 | 8/2009 | |
| DE | 102010010777 A1 | 9/2011 | |
| DE | 102013202207 A1 | 8/2014 | |
| DE | 102013003956 A1 | 9/2014 | |
| DE | 102015205766 A1 | 10/2016 | |
| EP | 0894918 A1 | 2/1999 | |
| EP | 1361121 A1 | 11/2003 | |
| EP | 2128360 A1 | 12/2009 | |
| EP | 3243710 A1 | 11/2017 | |
| EP | 3521111 B1 | 11/2020 | |
| FR | 2966486 A1 | 4/2012 | |
| FR | 2969076 A1 | 6/2012 | |
| JP | 2004067006 A | 3/2004 | |
| JP | 2006199179 A | 8/2006 | |
| JP | 2007203944 A | 8/2007 | |
| JP | 2008307956 A | 12/2008 | |
| JP | 2016007870 A | 1/2016 | |
| WO | 2014094696 A1 | 6/2014 | |
| WO | 2020156707 A1 | 8/2020 | |

* cited by examiner

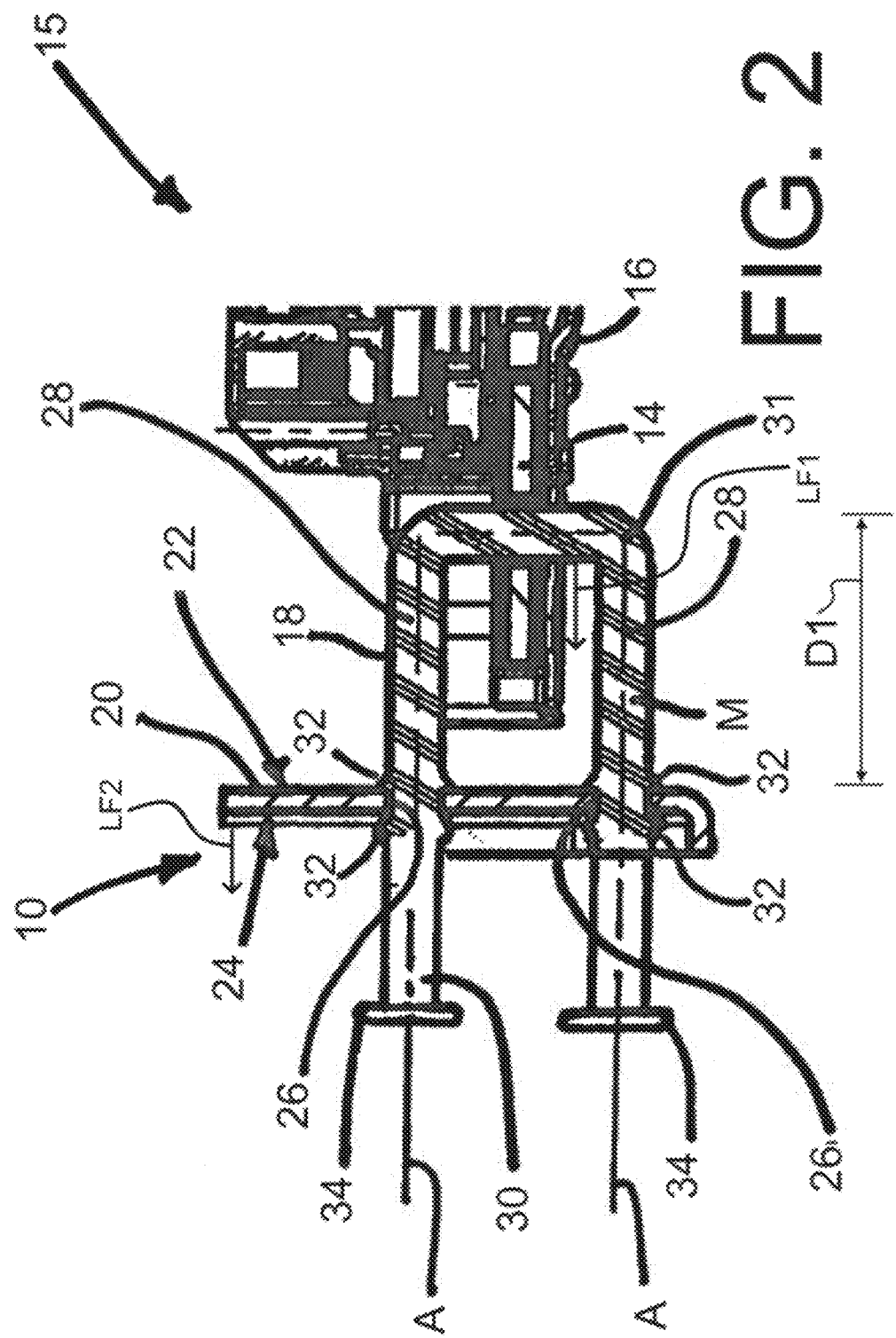

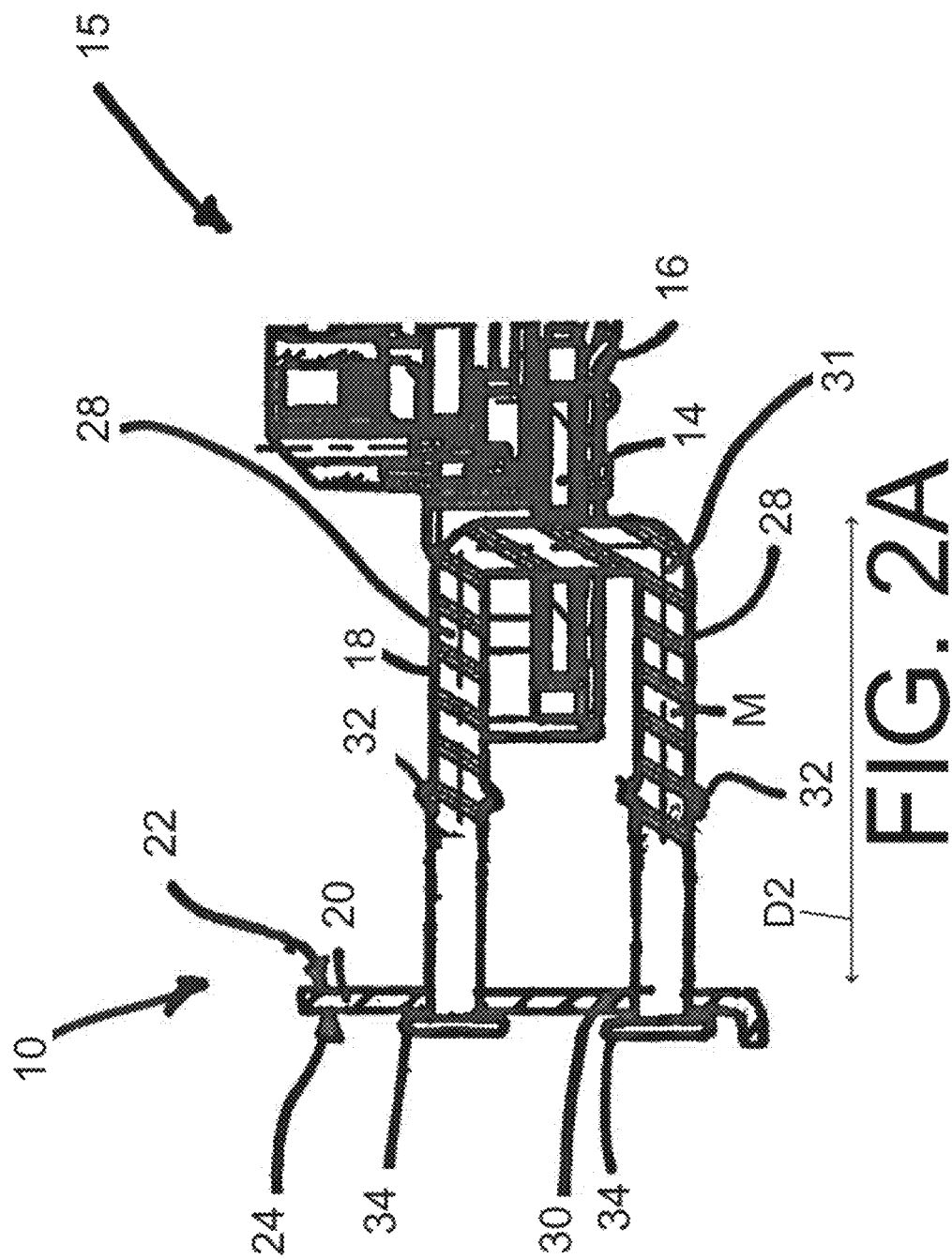

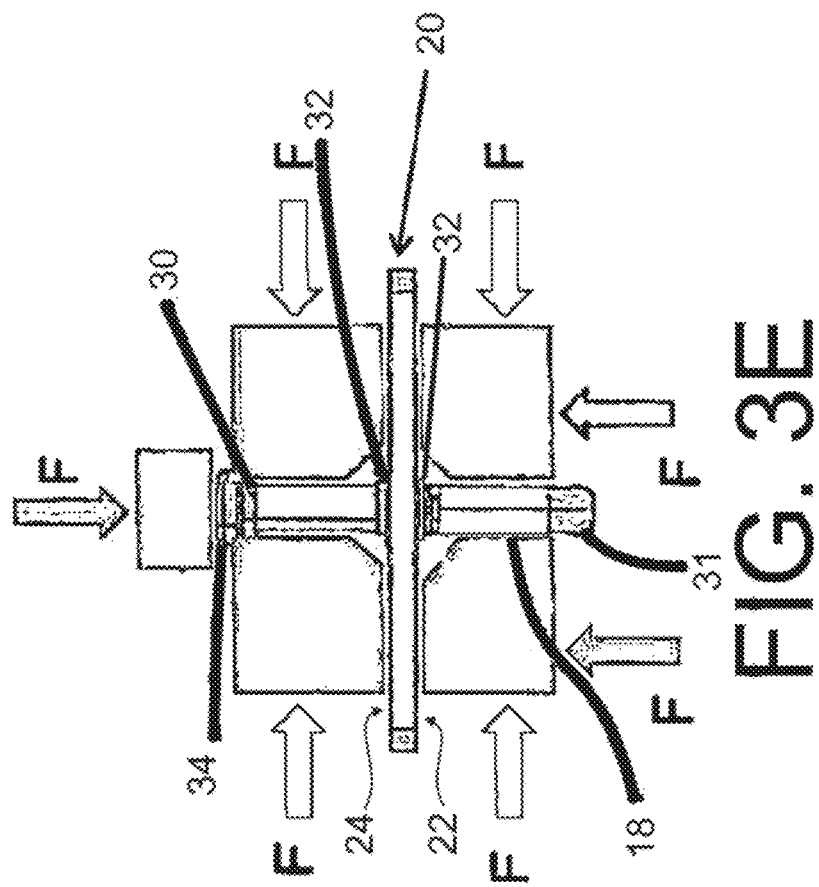
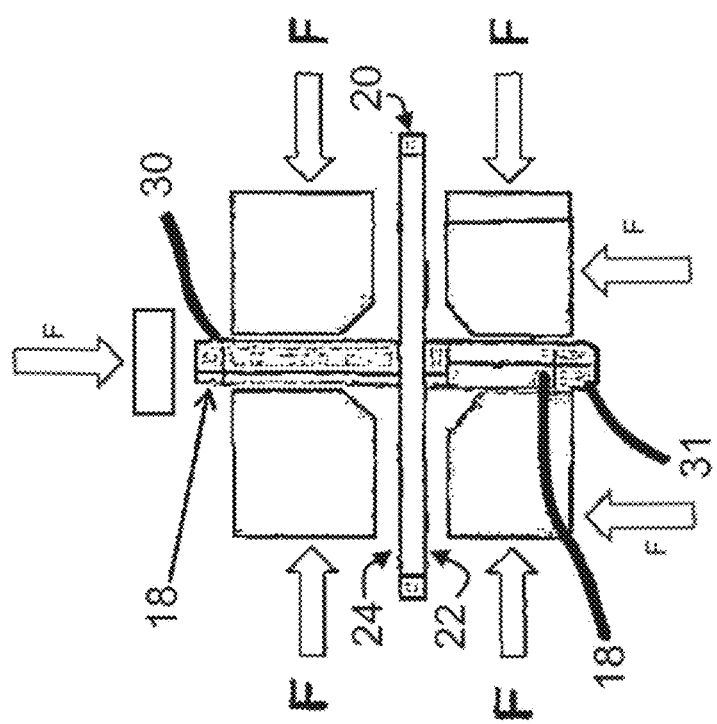

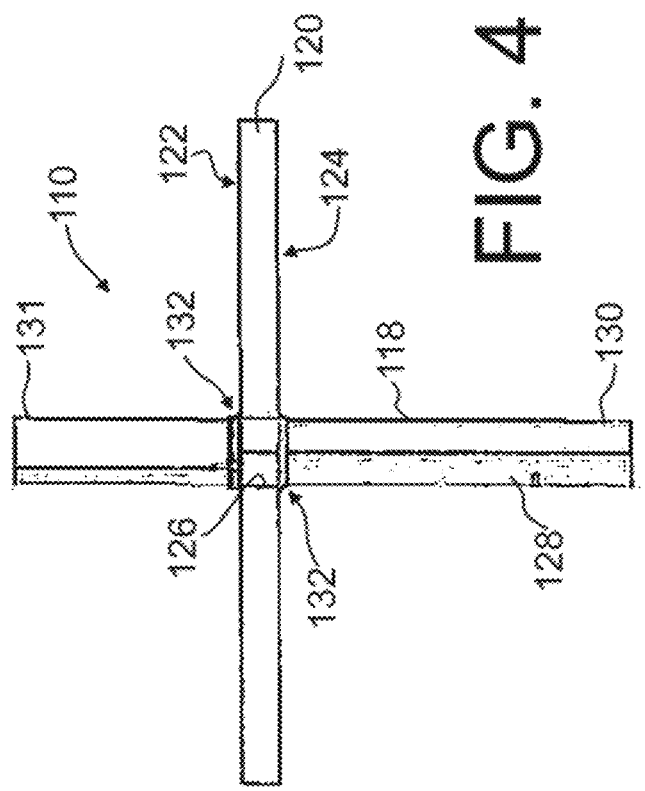
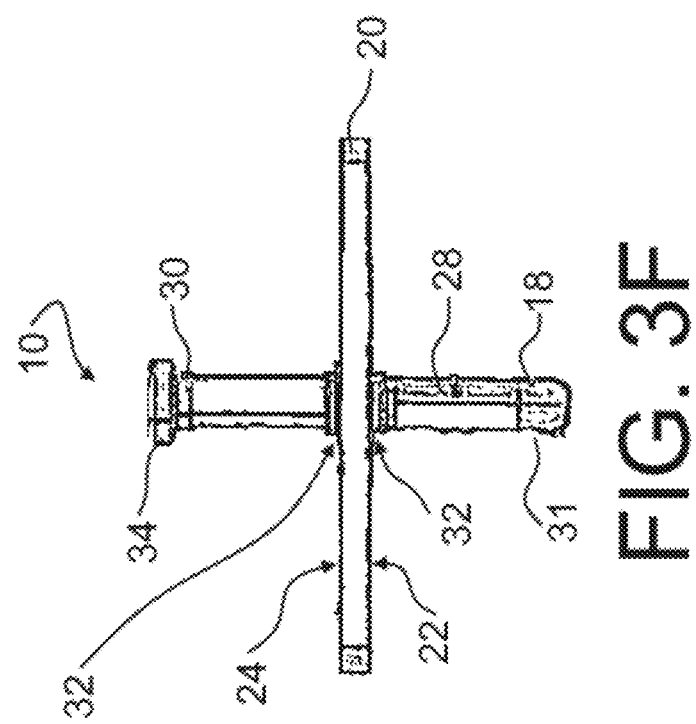

STRIKER ASSEMBLY FOR CLOSURE LATCH IN MOTOR VEHICLES

CROSS-REFERENCE TO RELATED APPLICATION

This application claims the benefit of U.S. Provisional Application Ser. No. 62/991,633, filed Mar. 19, 2020, and of U.S. Provisional Application Ser. No. 62/971,138, filed Feb. 6, 2020, which are both incorporated herein by reference in their entirety.

FIELD

The present disclosure relates to latch assemblies for motor vehicles, and more particularly, to striker assemblies therefor.

BACKGROUND

Known closure latch assemblies for automotive vehicles include a latch assembly and a striker assembly respectively carried by a closure panel to be opened and closed and an adjacent vehicle body structure, or vice versa. The striker assemblies generally have a striker, either U-shaped or generally straight (also referred to as a bolt) fixed to a metal support plate, which in turn is fixed to one of a metal support panel of the vehicle closure panel or vehicle body structure. The striker typically has a first end region fixedly attached in generally flush relation to the metal support plate, with an opposite second end region extending outwardly from the metal support plate for latched engagement with a ratchet of the latch assembly. As such, the striker has a single fixed position relative to the metal support plate, with the second end region having a predetermined dimension to maintain the closure panel in flush relation with the vehicle body structure while the latch assembly is in its closed position.

During a crash condition of a motor vehicle, the closure panel and/or vehicle body structure may become damaged and caused to shift from its customary position. If the latch assembly is maintained in its closed position during the crash, the displaced material of the closure panel and/or vehicle body structure may inhibit subsequent opening of the closure panel, in part due to the striker retaining the closure panel in its closed, flush relation with the adjacent vehicle body structure. Although such strikers perform their intended function for maintaining the closure panel in it closed position, an ability for the closure panel to remain uninhibited from being intentionally moved from its closed position to an open position in a post-crash condition is desired.

During normal use of the motor vehicle vibrations are generated, such as, by way of example, via the vehicle engine and gear train and by moving vehicle components, including closure panels, wherein the vibrations can travel throughout the vehicle. The vibrations can result in the production of noise that can be audible and inaudible. The inaudible noise is typically a low frequency noise that can be sensed via feel. Both the audible and inaudible noises are typically undesirable to vehicle occupants.

Further yet, the metal support plate fixed to the striker is commonly contained within a housing including a base plate and a cover. Screws are commonly used to fixed the base plate to a metal support panel of the vehicle closure panel or vehicle body structure, with heads of the screws passing through enlarged openings in the metal support plate. Accordingly, no forces acting on the metal support plate are transferred through the screws. The cover is typically fixed to the base plate by rivets, such as can be formed via folded or flattened projections of the base plate, thereby retaining the metal support plate within the housing. As a result, forces acting on the striker and the metal support plate pass solely through the rivets, which results in high stress loads on the rivets, which over time, can result in fatigue of the rivets, thus providing a source of noise, and potentially fracture, thereby causing the cover to separate from the base plate.

As such, while commercially-available strikers are satisfactory to meet all operational and regulatory requirements, a recognized need exists to advance the technology and provide strikers having optimized, reliable and repeatable performance, reduced complexity and packaging while providing both the desired functions in normal use condition and during emergency conditions, such as in a post-crash condition to allow a closure panel to remain unobstructed for intentional movement to an open position, provide reduced sources for the proliferation of vibration and noise, exhibit durable and long life in use, while being cost efficient in manufacture and assembly.

SUMMARY

This section provides a general summary of the present disclosure and is not a comprehensive disclosure of its full scope or all of its features, aspects and objectives.

In accordance with one aspect of the disclosure, a striker assembly for a closure panel of a motor vehicle and a method of construction thereof is provided, wherein the striker assembly includes a striker that overcomes drawbacks of strikers of known striker assemblies.

In accordance with one aspect of the disclosure, a striker of a striker assembly constructed in accordance with the disclosure is releasably fixed in a first position relative to a striker plate of the striker assembly to maintain a vehicle closure panel in a fully closed position generally flush with an adjacent vehicle body structure during normal use conditions and is automatically moveable to a second position during a crash condition to allow the vehicle closure panel to automatically move from its generally flush relation with the adjacent vehicle body structure to prevent the vehicle closure panel from being obstructed from intentional movement to an open position In accordance with another aspect of the disclosure, a striker assembly for a vehicle closure panel is provided. The striker assembly includes a striker plate having opposite sides with at least one opening extending through the opposite sides. The striker assembly further includes a striker having a body extending through the at least one opening. The body extends outwardly from one of the opposite sides to a first end region and outwardly from the other of the opposite sides to a second end region configured for latched engagement with a ratchet of a latch assembly. The body of the striker is releasably fixed in a first position relative to the striker plate during normal use conditions, whereat the striker maintains the vehicle closure panel in generally flush relation with an adjacent vehicle body structure while the ratchet is in a striker capture position. The body of the striker is automatically moveable to a second position relative to the striker plate during a crash condition to allow the vehicle closure panel to move outwardly from flush relation with the adjacent vehicle body structure, wherein material fixed to the body is intentionally deformable in the crash condition to allow the body to move automatically from the first position to the second position.

In accordance with another aspect of the disclosure, the material fixed to the body can be provided forming bulbous regions simultaneously confronting the opposite sides of the striker plate to maintain the body in the first position during normal use conditions.

In accordance with another aspect of the disclosure, at least one of the bulbous regions can be formed to be intentionally deformable in the crash condition to allow the body of the striker to automatically move to the second position.

In accordance with another aspect of the disclosure, the at least one of bulbous regions can be formed to be intentionally deformable in shear.

In accordance with another aspect of the disclosure, the material fixed to the body can be formed as a monolithic piece of material with the body.

In accordance with another aspect of the disclosure, the striker can further include a retainer member fixed to the body at the first end region in axially spaced relation from the bulbous regions, with the retainer region being enlarged relative to the at least one opening in the striker plate so as to not fit through the at least opening during normal use and in a crash condition.

In accordance with another aspect of the disclosure, the retainer member can be formed as a monolithic piece of material with the body.

In accordance with another aspect of the disclosure, the retainer member can be formed as a separate piece of material from the body.

In accordance with another aspect of the disclosure, the retainer member can be provided as an annular washer.

In accordance with another aspect of the disclosure, the annular washer can be fixed in an annular groove of the body.

In accordance with another aspect of the disclosure, a method of constructing a striker assembly for use with a latch assembly of a motor vehicle closure panel is provided. The method includes: providing a striker plate having opposite sides with at least one opening extending through the opposite sides; extending a body of the striker through the at least one opening such that the body extends outwardly from one of the opposite sides to a first end region and outwardly from the other of the opposite sides to a second end region configured for latched engagement with a ratchet of a latch assembly; attaching the body in a first position relative to the striker plate so that the body remains releasably fixed in the first position during normal use conditions whereat the striker maintains the vehicle closure panel in generally flush relation with an adjacent vehicle body structure while the ratchet is in a striker capture position, and so that the body is automatically moveable to a second position relative to the striker plate during a crash condition to allow the vehicle closure panel to move outwardly from flush relation with the adjacent vehicle body structure so that the vehicle closure panel is assured of not being inhibited from being intentionally opened thereafter; and, forming material fixed to the body to be intentionally deformable in the crash condition to allow the body to move automatically from the first position to the second position.

In accordance with another aspect of the disclosure, the method can further include forming the material fixed to the body to provide bulbous regions confronting the opposite sides of the striker plate to maintain the body in the first position during normal use conditions.

In accordance with another aspect of the disclosure, the method can further include forming at least one of the bulbous regions to be intentionally deformable in the crash condition to allow the body to automatically move to the second position.

In accordance with another aspect of the disclosure, the method can further include forming the at least one of the bulbous regions to be intentionally deformable in shear.

In accordance with another aspect of the disclosure, the method can further include forming the material fixed to the body as a monolithic piece of material with the body.

In accordance with another aspect of the disclosure, the method can further include providing the body having a retainer member fixed at the first end region in axially spaced relation from the bulbous regions with the retainer region being enlarged relative to the at least one opening so as to not fit through the at least opening during normal use and in a crash condition.

In accordance with another aspect of the disclosure, the method can further include providing the retainer member as a monolithic piece of material with the body.

In accordance with another aspect of the disclosure, the method can further include providing the retainer member as a separate piece of material from the body.

In accordance with another aspect of the disclosure, the method can further include providing the retainer member as an annular washer.

In accordance with another aspect of the disclosure, the method can further include fixing the annular washer in an annular groove of the body.

In accordance with one aspect of the disclosure, the striker assembly can include a decoupled, dampened striker arrangement that overcomes drawbacks of known striker assemblies.

In accordance with another aspect of the disclosure, a striker assembly for a closure panel of a motor vehicle and method of construction thereof is provided, wherein the striker assembly includes a dampened striker that transmits loads placed on the striker while in use directly on fasteners used to fix the striker assembly to one of a vehicle closure panel and vehicle body structure, thereby enhancing the strength and durability of the striker assembly, and thus, increasing the useful life of the striker assembly.

In accordance with the aspects above and other aspects of the disclosure, a striker assembly for a vehicle closure panel includes: a base plate having a plurality of base plate fastener openings; a striker plate having a first side and an opposite second side with a plurality of striker plate fastener openings extending therethrough, with the striker plate fastener openings being concentrically and/or axially aligned with the base plate fastener openings; a striker fixed to the striker plate and extending upwardly from the first side; a first elastomeric dampener disposed between the base plate and the second side of the striker plate, with the first elastomeric dampener having a plurality of first elastomeric dampener fastener openings concentrically and/or axially aligned with the base plate fastener openings; a top plate having a plurality of top plate fastener openings concentrically and/or axially aligned with the base plate fastener openings, with the top plate fastener openings being bounded by fastener seats; and a second elastomeric dampener disposed between the top plate and the first side of the striker plate, with the second elastomeric dampener having a plurality of second elastomeric dampener fastener openings concentrically and/or axially aligned with the base plate fastener openings, wherein the fastener seats are configured to abut heads of fasteners having shanks configured to extend through the aligned fastener openings, including the base plate fastener openings, the striker plate fastener openings, the first elastomeric dampener fastener openings, the top plate fastener openings, and the second elastomeric dampener fastener openings, with the shanks being configured for operable attachment to one of the vehicle closure panel or vehicle body structure such that the striker is retained against separation from the base plate by a tensile strength of the shanks of the fasteners.

In accordance with another aspect of the disclosure, one of the first elastomeric dampener and the second elastomeric dampener can be provided having a plurality of annular bosses extending through the striker plate fastener openings to prevent the shanks of the fasteners from contacting the striker plate and to enhance dampening of the top plate.

In accordance with another aspect of the disclosure, the first elastomeric dampener can be provided having the plurality of annular bosses and the second elastomeric dampener can be provided as being generally planar.

In accordance with another aspect of the disclosure, the annular bosses can be configured to engage the top plate to dampen the top plate against vibration.

In accordance with another aspect of the disclosure, the top plate can be provided having annular protrusions encircling the top plate fastener openings, with the annular protrusions being configured to extend into engagement with the annular bosses.

In accordance with another aspect of the disclosure, the annular protrusions can be provided having a tapered outer surface configured to mate with a tapered inner surface of the annular bosses.

In accordance with another aspect of the disclosure, the annular protrusions can be provided being frustoconical.

In accordance with another aspect of the disclosure, the top plate can be provided having countersunk surfaces opposite the tapered outer surfaces of the annular protrusions, with the countersunk surfaces being configured to receive the heads of the fasteners therein such that the heads are flush or recessed from a planar outwardly facing surface of the top plate.

In accordance with another aspect of the disclosure, the top plate can be provided having a plurality of through openings and the base plate can be provided having a plurality of tabs formed as a monolithic piece of material therewith, with the tabs being fixed in the through openings to secure the top plate to the base plate. It is to be recognized that the force applied to the striker while in use is not transmitted through the tabs, but rather, the force is transmitted through the fasteners fixed to one of the vehicle closure panel and vehicle body structure. As such, the tabs serve merely to facilitate handing the striker assembly as a self-contained unit, such as during shipping and assembly to one of the vehicle closure panel and vehicle body structure.

In accordance with another aspect of the disclosure, a method of constructing a striker assembly of a motor vehicle closure panel is provided. The method includes steps of: providing a base plate having a plurality of base plate fastener openings; providing a striker plate having a striker fixed thereto and having a plurality of striker plate fastener openings; disposing a first elastomeric dampener having a plurality of first elastomeric dampener fastener openings between the base plate and the striker plate with the first elastomeric dampener fastener openings being concentrically and/or axially aligned with the base plate fastener openings and the striker plate fastener openings; disposing a second elastomeric dampener having a plurality of second elastomeric dampener fastener openings over the striker plate with the second elastomeric dampener fastener openings being concentrically and/or axially aligned with the base plate fastener openings; and providing a top plate having a plurality of top plate fastener openings bounded by fastener seats and disposing the top plate over the second elastomeric dampener such that the second elastomeric dampener is sandwiched between the striker plate and the top plate and configuring the fastener seats to engage heads of fasteners upon fixing the striker assembly to one of a vehicle closure panel and a vehicle body structure via shanks of the fasteners such that the striker is retained against separation from the base plate by a tensile strength of the shanks of the fasteners.

In accordance with another aspect of the disclosure, the method can further include a step of bringing annular protrusions of the top plate, encircling the top plate fastener openings, into dampened engagement with the first elastomeric dampener and the second elastomeric dampener.

In accordance with another aspect of the disclosure, the method can further include a step of bringing the annular protrusions of the top plate into dampened engagement with annular bosses of the first elastomeric dampener.

In accordance with another aspect of the disclosure, the method can further include a step of extending the annular bosses of the first elastomeric dampener through the plurality of striker plate fastener openings in the striker plate and into dampened engagement with the top plate.

In accordance with another aspect of the disclosure, there is described a striker assembly for a vehicle closure panel of a vehicle having a vehicle body, the striker assembly having a striker for coupling to one of the vehicle closure panel and the vehicle body and configured for latched engagement with a ratchet of a latch assembly provided on the other one of the vehicle closure panel and the vehicle body, where the striker has a normal use condition for maintaining the vehicle closure panel in a normal position relative to the vehicle body when in latched engagement with the ratchet, and a crash condition for allowing the vehicle closure panel to move away from the normal position relative to the vehicle body when in latched engagement with the ratchet.

In accordance with another aspect of the present disclosure, there is described a vehicle having a vehicle body, having a closure member moveably coupled to the vehicle body, a latch assembly coupled to one of the closure member and the vehicle body, a striker coupled to the other one of the vehicle closure panel and the vehicle body, the striker configured for latched engagement with a ratchet of the latch assembly, where the striker has a normal use condition for maintaining the vehicle closure panel in a normal position relative to the vehicle body, and a crash condition for allowing the vehicle closure panel to move away from the normal position relative to the vehicle body. In a related aspect, the vehicle may further include an actuator for applying an actuation force on the closure member to move the closure member away from the vehicle body, where applying the actuation force on the closure member causes the striker assembly to transition from the normal use condition to the crash condition.

In accordance with yet another aspect of the disclosure, there is described a method of operating a striker assembly for use with a latch assembly of a motor vehicle closure panel moveably coupled to a vehicle body, including applying a force to one of the motor vehicle closure panel and the vehicle body for moving the closure panel away from the vehicle body, where applying the force causes the striker assembly to structurally deform to allow the closure panel to move away from the vehicle body.

BRIEF DESCRIPTION OF THE DRAWINGS

These and other aspects, features and advantages of the present disclosure will be readily appreciated, as the same becomes better understood by reference to the following detailed description when considered in connection with the accompanying drawings wherein:

FIG. 2 is a cross-sectional view of a striker assembly and latch assembly of FIG. 1 shown in a normal operating condition while in a closed, striker capture position;

FIG. 2A is a view similar to FIG. 2 with the striker assembly shown in a crash condition;

FIGS. 3A-3F illustrate a sequence of steps used to construct the striker assembly of FIGS. 2 and 2A;

FIGS. 4 and 4A illustrate steps used to construct a striker in accordance with another aspect of the disclosure;

DETAILED DESCRIPTION OF EXAMPLE EMBODIMENTS

Figure 1:
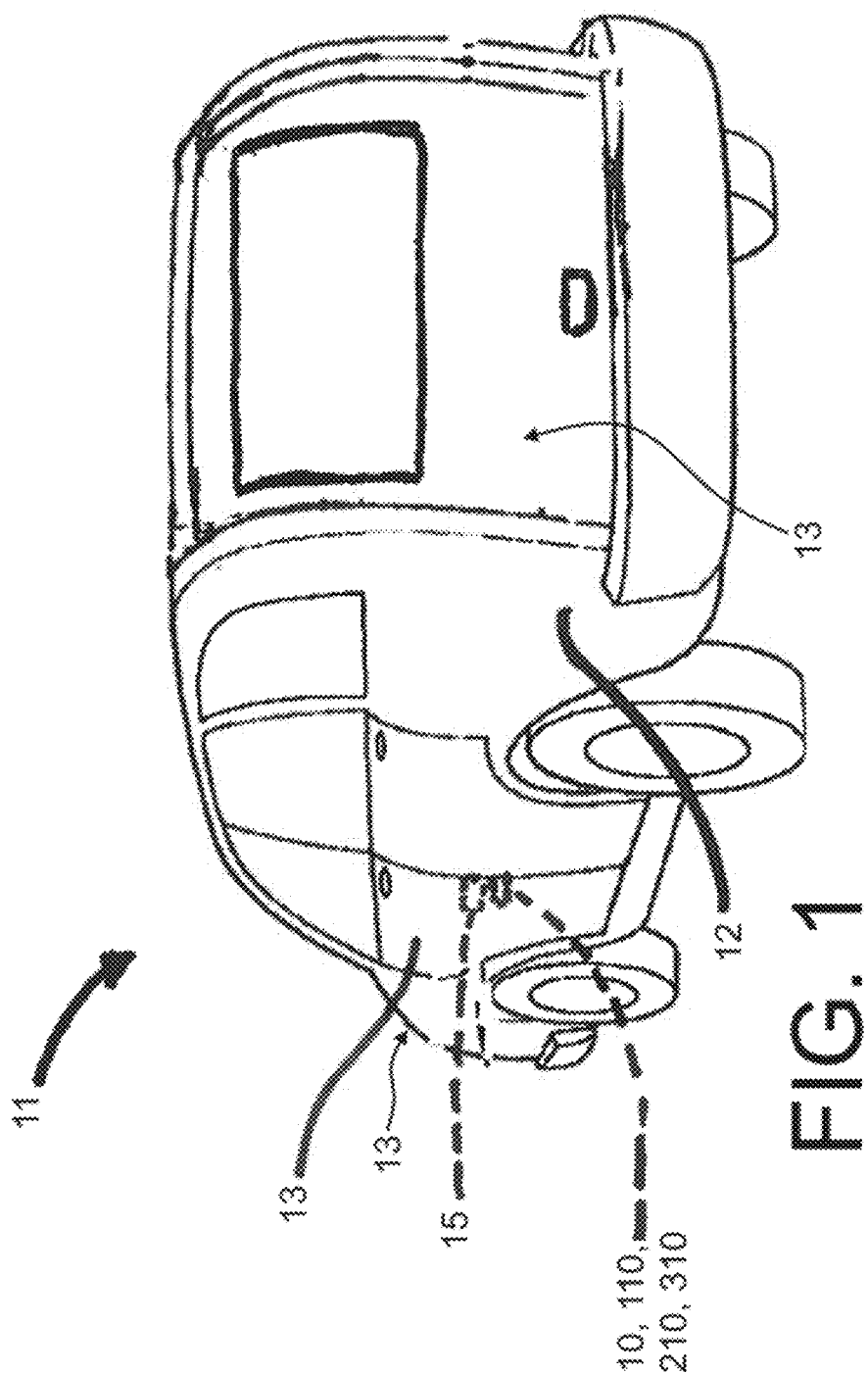
FIG. 1 is a perspective view of a motor vehicle having a striker assembly in accordance with the disclosure configured for latched coupling with a latch assembly.

In general, example embodiments of striker assemblies constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Reference is made to FIG. 1, which shows a motor vehicle 11 that has a closure panel, such as a front door 13, by way of example and without limitation, to which there is a latch assembly 15 attached, wherein the latch assembly 15 (FIG. 2) is configured for latched/unlatched coupling with a striker assembly striker assembly 10 constructed in accordance with an aspect of the disclosure. The striker assembly 10 is shown mounted on a vehicle body structure, referred to hereafter as body 12, of the motor vehicle 11, while latch assembly 15 is shown mounted to the front door 13, though it is to be understood that the latch assembly 15 and striker assembly 10 could be reversed in orientation, or in association with different closure panels, such as rear closure panels and a rear hatch or liftgate, for example. Referring to FIG. 2, the latch assembly 15 includes a ratchet 14 that is pivotably connected to a latch housing 16 and is movable between a closed position (striker capture position), whereat front door 13 is maintained in its closed position in generally flush relation with an adjacent outer surface of vehicle body structure, such as a B-pillar region and rear door (such as a sliding door, by way of example and without limitation, and an open position (striker release position), wherein front door 13 is able to be moved to its open position in response to selective actuation of latch assembly 15. Examples of a vehicle latch assembly having a ratchet for retaining and releasing a striker are shown in International patent application No. WO2004/074607A2 entitled "Hood Latch Assembly", and U.S. Pat. No. 6,880,866 entitled "Vehicle door latch", the entire contents of which are incorporated herein by reference. The ratchet 14 prevents the withdrawal of a striker 18 of the striker assembly 10 when in the closed position and allows withdrawal of the striker 18 when in the open position. Striker assembly 10 is constructed, as discussed in more detail below, to allow front door 13 to move from outwardly from its generally flush relation with the adjacent outer surface of vehicle body structure in a crash condition to prevent the front door 13 from being obstructed from being intentionally opened thereafter. Striker assembly 10 is constructed, as discussed in more detail below, to allow front door 13 to move outwardly, such as for example away from the vehicle body 12 while the striker assembly 10 is in latched engagement with a latch assembly 15, without the ratchet having to rotate to from a latched position to either a fully or partially unlatched position. For example, the striker assembly 10 is constructed to allow front door 13 to be positioned relative to the vehicle body 12 in a normally closed position when the striker assembly 10 is in primary latched engagement with the latch assembly 15 such that the door 13 is fully closed when the striker assembly 10 is in the normal condition. When in such a normally or fully closed position the front door 13 may be at a normal distance from the vehicle body 12, for example which may align the front door 13 outer surface flush with the outer surface of the vehicle body 12. For example the front door 13 may be at a first distance from the vehicle body 12, or for example the second end region 31 may be at a first distance D1 from the striker plate 20 as shown in FIG. 2 when the striker assembly 10 is in the normal use condition. Such is an example of a normal position of the front door 13 relative to the vehicle body 12 when the striker assembly 10 is in latched engagement with the ratchet of the latch assembly 15 and the striker assembly 10 is in a normal use condition. Although striker assembly 10 is discussed in relation to front door 13, it is contemplated herein that striker assembly 10 could be used with any other closure panel of vehicle 11. For example, striker assembly 10 could be used for a rear liftgate of the vehicle 11, a sliding door of the vehicle 11, a rear passenger door of the vehicle, or for a front hood 5 of the vehicle 11 for enclosing an engine bay, or for a front trunk (or "Frunk") of the vehicle 11 for enclosing a luggage compartment provided normally where a gasoline powered engine would be positioned.

Figure 3C:
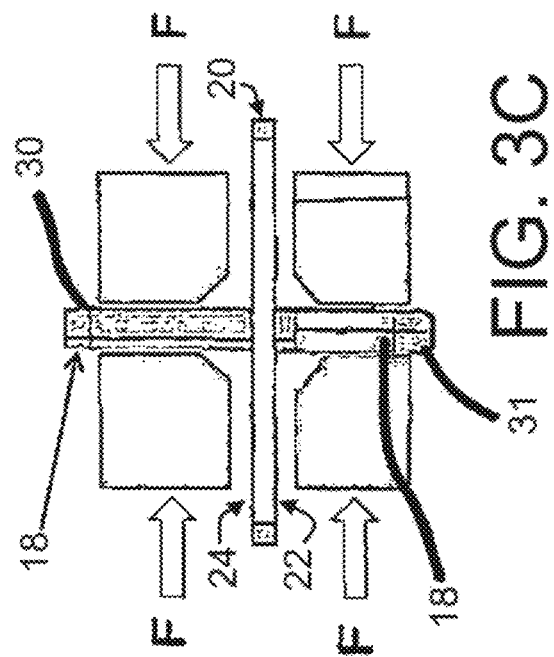
Figure 3B:
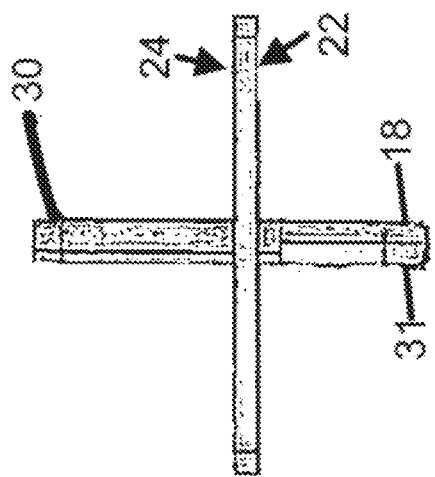
Figure 3A:
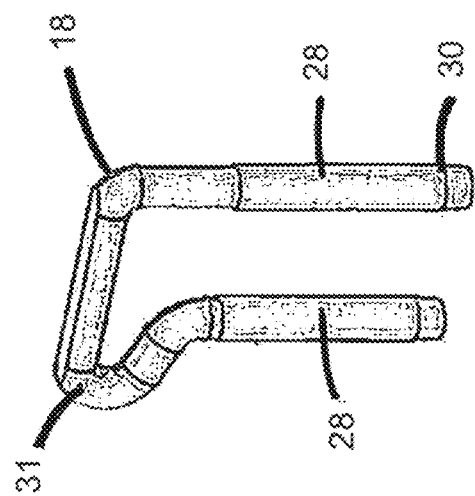

As best shown in FIGS. 2 and 3, the striker assembly 10 includes a striker plate 20 having opposite sides 22, 24 with at least one opening 26 extending through the opposite sides 22, 24. The striker 18 has a body extending through the at least one opening, and wherein the body of the striker 18 is shown in a non-limiting embodiment as being generally U-shaped, having a pair of generally cylindrical body portions 28 (collectively referred to as the body) extending through corresponding pairs of openings 26. The body portions 28 extend outwardly from one of the opposite sides 24 along longitudinal axes A (facing inwardly into a passenger compartment of motor vehicle 11) to a first end region 30 and outwardly from the other of the opposite sides 22 (facing outwardly from passenger compartment of motor vehicle 11) to a second end region 31 configured for latched engagement with the ratchet 14 of a latch assembly 15. The body 28 of the striker 18 is releasably fixed in a first position (FIG. 2) relative to the striker plate 20 during normal use conditions, whereat the striker 18 maintains the vehicle closure panel 13 in its generally flush relation with the adjacent vehicle body structure 12 while the ratchet 14 is in its striker capture position. The body 28 of the striker 18 is automatically moveable to a second position (FIG. 2A) relative to the striker plate 20 during a crash condition to allow the vehicle closure panel 13 to move outwardly from its flush relation with the adjacent vehicle body structure 12, wherein material M fixed the body 28 is intentionally deformable in the crash condition to allow the body 28 to move automatically from the first position to the second position. The movement may be, in accordance with one example, a linear movement, or substantially linear, non-rotatable, movement. For example, the movement of the body 28 may only include one direction, or may include more than one direction. The body 28 may be configured for sliding movement within apertures 26 of the striker plate 20. Striker assembly 10 may therefor include at least one deformable region (for example two deformable regions may be provided, such as the bulbous regions 32, each positioned on the parallel extending arms of the body 28 of the striker loop as shown in FIG. 3A, that deform in response to a loading applied to the striker assembly 10 above a predetermined loading value, which may be in the hundreds or thousands of Newtons depending on the application and the desired condition when the striker assembly 10 should be transitioned from the normal use condition to the non-normal condition, or crash condition. As shown in FIG. 2, such a loading force (LF1) may be applied either by the ratchet acting on the second end region 31 when the latch assembly 15 is connected to the closure member 13 and the striker assembly 10 is mounted to the vehicle body 11 such as for a side door configuration for causing a separation and movement between the striker plate 20 and the body 28, or such a loading force (LF2) may be applied on the striker plate 20 by the closure member 13 when the latch assembly 15 is connected to the vehicle body 12 such as for a hood or frunk configuration. Deformation may be a structural deformation, such as a shape change in the striker assembly 20 e.g. a change in the striker body 20 or a structural change in the protrusions or bulbous regions 32. Structural deformation may be a permanent structure deformation. For example, when the closure panel 13 is configured as a front hood, and the front hood 13 is moveable in a crash situation whereby an active deployable mechanism, such as a pyrotechnic actuator with a deployable piston, acts on the hood 13 to apply an actuation force to urge the hood 13 upwardly and away from the vehicle body 12, such as away from a first position of the hood 13 relative to the vehicle body 12 which may be a normally closed position when the striker assembly 10 is in a normal use condition, to a greater displacement or second distance of the hood 13 from the vehicle body 12 such as away from the first position and to a second position of the hood 13 relative to the vehicle body 11 where the second position is greater than the first position when the striker assembly 10 is in a crash condition, the predetermined value required to be applied to the striker assembly 10 to cause the striker assembly 10 to transition from the normal use condition to the crash condition may be related to the output force of the actuator acting on the hood 13, and less than the output of the pyrotechnic actuator, so as to allow the pyrotechnic actuator to shift the striker assembly 10 from its normal use condition to the crash condition when the pyrotechnic actuator deploys. For example in the crash condition of the striker assembly 10, the second end region 31 may be at a second distance D2 from the striker plate 20 as shown in FIG. 3. In such a configuration, the latch assembly 15 therefor does not require to be unlatched from the striker assembly 10 (in other words, not release of a pawl holding the ratchet is required) to allow the hood 13 to move away from its fully closed position to a partially deployed position, or to a crash position. Such a configuration simplifies the process for allowing the closure member 13 to move to a crash state or position relative to the vehicle body 12 without having to separately control release of the latch assembly 15, such as controlling movement of a pawl away from a ratchet, to first unlatch the striker assembly 15 before the closure member 13 can move away from a fully closed position. Additionally, such a configuration allows the crash position of the closure panel 13 to be limited by the latched engagement of the latch 15 with the striker assembly 10 when the striker assembly 10 is in the crash condition since the abutment of the retainer member 34 with the striker plate 20 will limit the distance of separation of the second end region 31 from the striker plate 20. In other words, the latched state of the latch assembly 15 does not change during the striker assembly 10 transitioning from the normal use condition to the crash condition while the closure panel 13 position may change from a normal position relative to the vehicle body 12 to a crash or partially opened position relative to the vehicle body 12. The latch assembly 15 therefore remains in the latched position when the striker assembly 10 is in the normal use condition, during the transition of the striker assembly 10 from the normal use condition to the crash condition, and when the striker assembly 10 is thereafter in the crash condition. It is to be understood that the material M remains in its "as constructed" configuration and in a non-deformed state during normal use, wear and tear, whereat the striker 18 is under normal loads (forces) expected during normal use, but is only deformable, and thus, deformed, to allow movement of striker 18 relative to the striker plate 20 from the first position to the second position, upon experiencing an excessively high, abnormal force or loading transmitted generally along the axis A well in excess of a force produced during normal use, such as an excessive force typically associated with a crash condition of motor vehicle 11, by way of example and without limitation.

The material M fixed to the body 28 can be provided with radially enlarged regions (radially being relative to the longitudinal axes A), also referred to as protrusions or bulbous regions 32, on opposite side of the striker plate 30, with bulbous regions 32 on each body portion 28 simultaneously confronting and engaging the opposite sides 22, 24 of the striker plate 30 to maintain the body 28 in the first position during normal use conditions. The bulbous regions 32 extend laterally outwardly from body portion 28, wherein body portions 28 can be formed as generally cylindrical members, with bulbous regions 32 extending radially outwardly therefrom, as discussed above. Deformation of bulbous regions 32 as deformable features or regions of the striker body 28, may allow body portion 28 to move relative to the striker plate 20, and for example allow body portion 28 to move through or slide within apertures 26 formed in the striker plate 20. Bulbous regions 32 can be formed via upsetting (plastically deforming) the material M of striker 18, such as via a forging operation, by way of example and without limitation (FIGS. 3C-3E), and thus, the material M can be provided as a monolithic piece of material with the body 28, and thus, providing the body 28 and the bulbous regions 32 as a homogeneous piece of the same material. It is to be recognized that bulbous regions 32 could be formed otherwise, such as via a material formed from a separated piece of material from the body 28, such as in an additive process, welding, mechanically fixing or bonding a piece of material to the body 28, or otherwise. Further, the size, cross-sectional shape, as viewed in axial cross-section of FIG. 2, and overall configuration of the bulbous regions 32, whether being annular (circumferentially continuous) or circumferentially discontinuous, can be formed as desired to provide the desired strength and resistance to deformation against an axially applied force along axis A, thereby precisely controlling the amount of axially applied force required to deform and/or shear the bulbous regions 32 to allow the striker 18 to move relative to striker plate 20 axially along the direction of axes A from the first position to the second position. Accordingly, the bulbous regions 32 are intended to prevent the striker 18 from moving relative to the striker plate 20 under intended normal use conditions, but to be sufficiently deformed to allow the striker 18 to move relative to the striker plate 20 under an unintended, abnormally high force applied to striker 18, such as a force known to be produced in a crash condition via empirical data obtained from crash simulating studies. Other deformable connections between the striker loop 18 and the striker plate may be provided, for example such as deformable retention brackets, deformable pins or rivets, a deformable striker plate 20 connection with closure member 13 e.g. deformable fasteners connecting the striker plate 20 to the vehicle body 12 or vehicle closure member 13, or a deformable expandable shape of the striker loop 13 as but examples.

In accordance with another aspect of the disclosure, at least one of the bulbous regions 32 can be formed to be intentionally deformable under an unintended, abnormally high force, such as in a crash condition, to allow the body 28 of the striker 18 to automatically move to the second position (FIG. 2A). For example, the bulbous regions 32 formed to engage the side 22 of striker plate 20 facing outwardly from the passenger compartment of the motor vehicle 11 can be formed to be intentionally deformed in shear under crash load conditions. Accordingly, the bulbous regions 32 become effectively sheared off from body 28, thereby doing away with the fixation feature preventing movement of striker 18 relative to striker plate 20.

The striker 18 can further include a retainer region, such as provided by a retainer member 34 fixed to the body 28 at the first end region 30 in axially spaced relation from the bulbous regions 32. The retainer member 34 is enlarged relative to the at least one opening 26 in the striker plate 20 so as to not fit through the at least opening 26 during normal use and in a crash condition. As such, the retainer member 34 prevents the striker 18 from being able to be separated from striker plate 18, as intended in normal use. In accordance with one aspect, the retainer member 34 can be formed as a monolithic piece of material with the body 28 in a forging process, including in the same and simultaneous forging process used to form bulbous regions 32, by way of example and without limitation. In accordance with another aspect, the retainer member 34 can be formed as a separate piece of material from the body 28, such as via an annular washer. Annular washer could be fixed to body 28 in a welding process, cold forming swaging process, or otherwise. Striker 18 is shown in FIG. 3A prior to the formation of bulbous regions 32 and retainer members 34 and prior to being fixed to striker plate 20, and is shown in FIG. 3F after being fixed to striker plate 20 via the formation of bulbous regions 32 and after forming retainer members 34 at the first end region 30 of each body portion 28 (process of forming the bulbous regions 32 and retainer members 34 being illustrated sequentially in FIGS. 3C-3E).

Figure 4A:
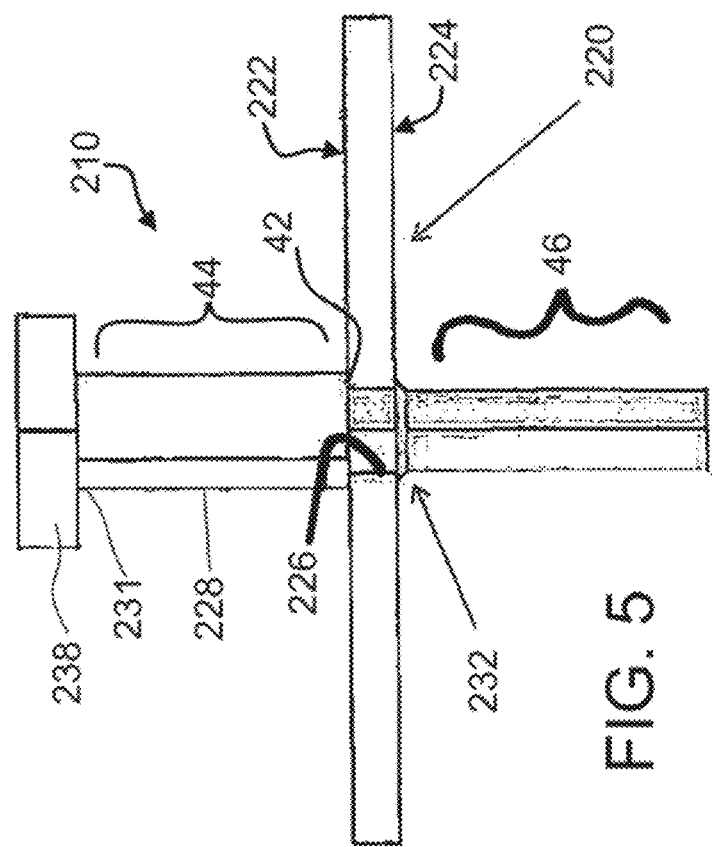

In FIGS. 4 and 4A, a striker assembly 110 constructed in accordance with another aspect of the disclosure is shown, wherein the same reference numerals, offset by a factor of 100, are used to identify like features.

Striker assembly 110 is shown as a bolt type striker, having a striker 118 with a straight body 128 extending through an opening 126 passing through opposite sides 122, 124 of a striker plate 120 to opposite first and second end regions 130, 131, respectively, such that the opposite end regions 130, 131 are located on opposite sides of striker plate 120. Striker 118 has bulbous regions 132 fixed on body 128, wherein bulbous regions 132 are provided to engage the opposite sides 122, 124 of striker plate 120 to fix striker 118 relative to striker plate 120 during normal use, as discussed above for bulbous regions 32 on striker 18 of striker assembly 10. Striker assembly 110 also includes a retainer member 134 (FIG. 4A), shown formed as a separate piece of material from body 128, wherein retainer member 134 is shown an annular member, such as a washer or snap-type ring, by way of example and without limitation. Retainer member 134 can be fixed to striker body 128 via any suitable bonding mechanism (high strength adhesive, weld joint or the like) or mechanical fixation mechanism, and is shown in the non-limiting embodiment as being fixed in an annular groove 36 of the body 128. It is to be recognized that the retainer member 134 can be disposed on a reduced diameter end region, with the end region then being cold formed to expand and retain retainer member 134 in fixed relation on striker body 128.

Striker assembly 110 has a ratchet holding feature, also referred to as ratchet catch member 38, at the second end region 131, shown formed as a separate piece of material from body 128, wherein ratchet catch member 38 is shown an annular member, such as a washer, by way of example and without limitation. Ratchet catch member 38 can be fixed to striker body 128 via any suitable bonding mechanism or mechanical fixation mechanism, as discussed above for retainer member 134, and is shown in the non-limiting embodiment as being fixed in an annular groove 40 of the body 128. It is to be recognized that the ratchet catch member 38 can be disposed on a reduced diameter end region, with the end region then being cold formed to expand and retain retainer member in fixed relation on striker body 128, as discussed above for retainer member 134.

Figure 5:
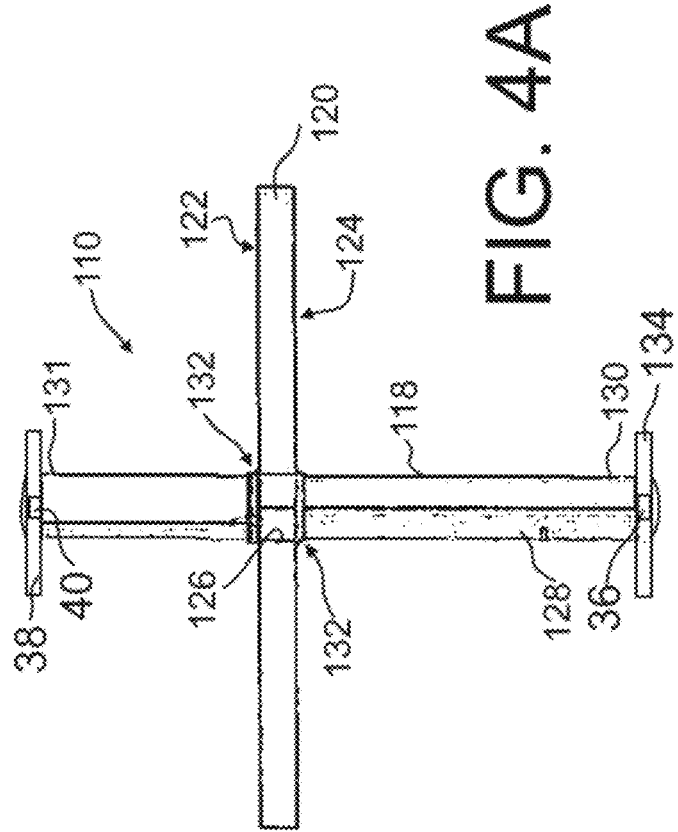
FIGS. 5 and 5A illustrate steps used to construct a striker in accordance with another aspect of the disclosure.
Figure 5A:
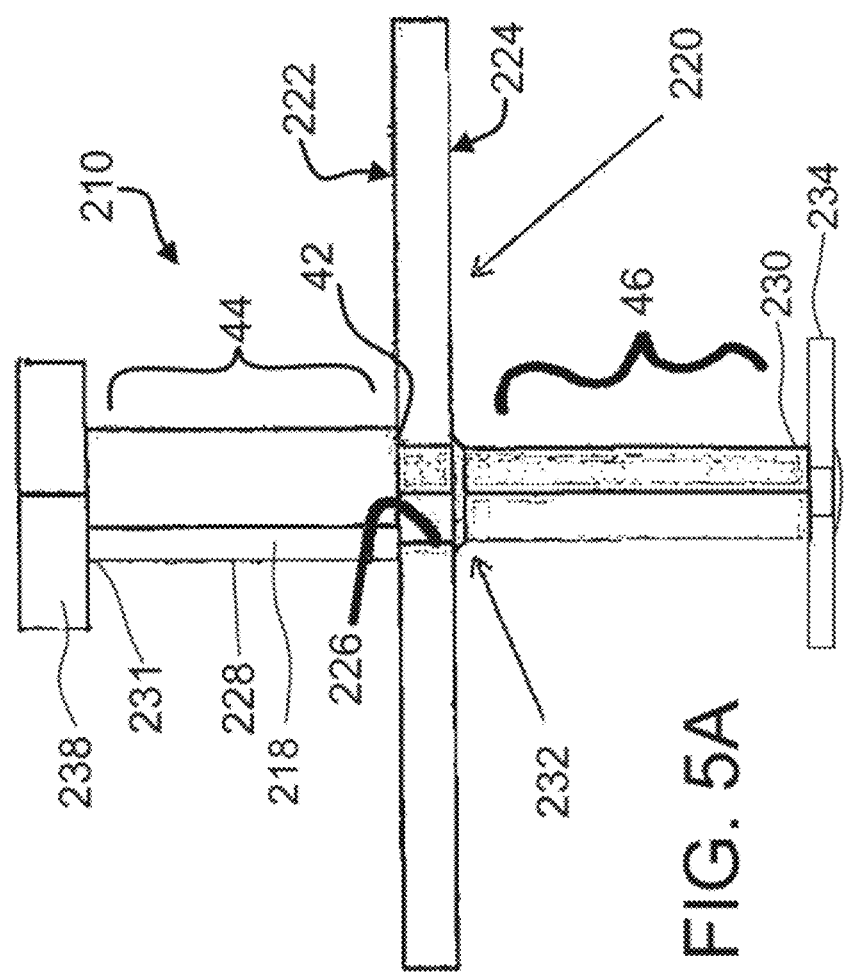

In FIGS. 5 and 5A, a striker assembly 210 constructed in accordance with another aspect of the disclosure is shown, wherein the same reference numerals, offset by a factor of 200, are used to identify like features.

Striker assembly 210 is similar to striker assembly 110, having a striker 218 and a striker plate 220, with retainer member 234 (FIG. 5A) provided as an annular washer at a first end region 230 and a ratchet catch member 238 provided at a second end region 231 of a body 228. However, ratchet catch member 238 is formed as a monolithic piece of material with body 228, and a face, also referred to as side 222, of striker plate 220 facing outwardly from a vehicle body structure of motor vehicle 11 is seated against an annular shoulder 42 of striker body 228. As such, body 228 has an enlarged first diameter region 44 and a reduced second diameter region 46, with shoulder 42 extending and forming a transition therebetween. In construction, reduced second diameter region 46 can be disposed through an opening 226 in striker plate 220, and then a bulbous region 232 can be formed to confront a face, also referred to as side 224, of striker plate 220 facing toward the vehicle body structure of motor vehicle 11. As discussed above, the bulbous region 232, regardless of how formed, as discussed above for bulbous region 32, 132, is constructed to deform, such as in shear, during a crash condition to allow striker 218 to move from a first position to a second position, as discussed above.

Figure 6:
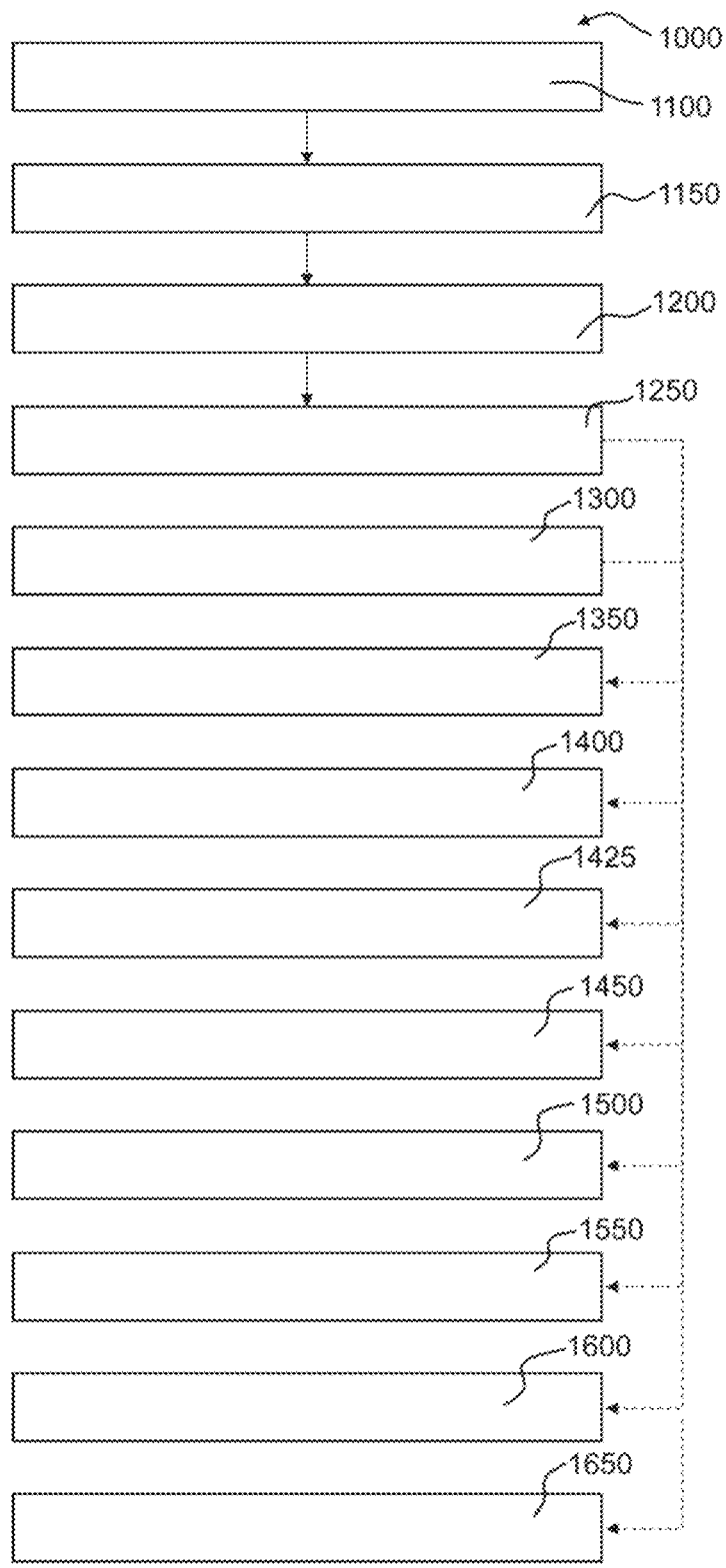
FIG. 6 illustrates a flow diagram of a method of constructing a striker assembly for use with a latch assembly of a motor vehicle closure panel in accordance with another aspect of the disclosure.

In accordance with a further aspect, FIG. 6 illustrates a method 1000 of constructing a striker assembly 10, 110, 210 for use with a latch assembly 15 of a motor vehicle closure panel 13. The method 1000 includes: a step 1100 of providing a striker plate 20, 120, 220 having opposite sides 22, 24; 122, 124; 222, 224 with at least one opening 26, 126, 226 extending through the opposite sides 22, 24; 122, 124; 222, 224; a step 1150 of extending a body 28, 128, 228 of a striker 18, 118, 218 through the at least one opening 26, 126, 226 such that the body 28, 128, 228 extends outwardly from one of the opposite sides 24, 124, 224 to a first end region 30, 130, 230 and outwardly from the other of the opposite sides 22, 122, 222 to a second end region 31, 131, 231 configured for latched engagement with a ratchet 14 of a latch assembly 15; a step 1200 of attaching the body 28, 128, 228 in a first position relative to the striker plate 20, 120, 220 so that the body 28, 128, 228 remains releasably fixed in the first position during normal use conditions whereat the striker 18, 118, 218 maintains the vehicle closure panel 13 in generally flush relation with an adjacent vehicle body structure while the ratchet 14 is in a striker capture position, and so that the body 28, 128, 228 is automatically moveable to a second position relative to the striker plate 20, 120, 220 during a crash condition to allow the vehicle closure panel 13 to move outwardly from flush relation with the adjacent vehicle body structure so that the vehicle closure panel 13 is assured of not being inhibited from being intentionally opened thereafter; and, a step 1250 of forming material M fixed to the body 28, 128, 228 to be intentionally deformable in the crash condition to allow the body 28, 128, 228 to move relative to the striker plate 20, 120, 220 automatically from the first position to the second position.

In accordance with another aspect of the disclosure, the method 1000 can further include a step 1300 of forming the material M fixed to the body 28, 128, 228 to provide bulbous regions 32, 132, 232 confronting the opposite sides 22, 24; 122, 124; 222, 224 of the striker plate 20, 120, 220 to maintain the body 28, 128, 228 in the first position during normal use conditions.

In accordance with another aspect of the disclosure, the method 1000 can further include a step 1350 of forming at least one of the bulbous regions 32, 132, 232 to be intentionally deformable in the crash condition to allow the body 28, 128, 228 to automatically move relative to the striker plate 20, 120, 220 to the second position.

In accordance with another aspect of the disclosure, the method 1000 can further include a step 1400 of forming the at least one of the bulbous regions 32, 132, 232 to be intentionally deformable in shear to allow the body 28, 128, 228 to move axially through the opening 26, 126, 226 and the striker 18, 118, 228 to move relative to the striker plate 20, 120, 220.

In accordance with another aspect of the disclosure, the method 1000 can further include a step 1425 of forming the material M fixed to the body 28, 128, 228 as a monolithic piece of material with the body 28, 128, 228, such that the body 28, 128, 228 and the material M of the bulbous regions 32, 132, 232 are formed from as a homogenous piece of the same material.

In accordance with another aspect of the disclosure, the method 1000 can further include a step 1450 of providing the body 28, 128, 228 having a retainer member 34, 134, 234 fixed at the first end region 30, 130, 230 in axially spaced relation from the bulbous regions 32, 132, 232 with the retainer member 34, 134, 234 being enlarged relative to the at least one opening 26, 126, 226 so as to not fit through the at least opening 26, 126, 226 during normal use and in a crash condition.

In accordance with another aspect of the disclosure, the method 1000 can further include a step 1500 of providing the retainer member 34 as a monolithic piece of material with the body 28.

In accordance with another aspect of the disclosure, the method 1000 can further include a step 1550 of providing the retainer member 134, 234 as a separate piece of material from the body 128, 228.

In accordance with another aspect of the disclosure, the method 1000 can further include a step 1600 of providing the retainer member 134, 234 as an annular washer.

In accordance with another aspect of the disclosure, the method 1000 can further include a step 1650 of fixing the annular washer 134, 234 in an annular groove 36 of the body 128, 228.

Figure 14A:
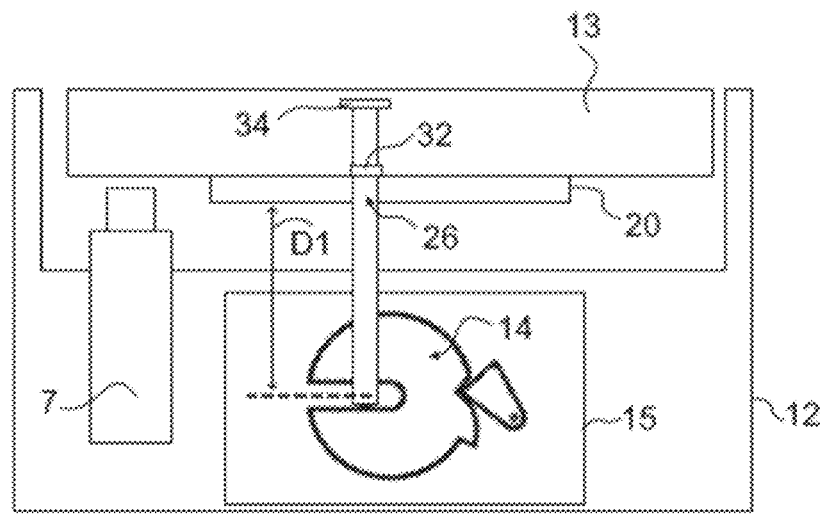
FIG. 14A to 14C illustrates a series of views of a closure panel moving away from a vehicle body in response to an actuator transitioning the striker assembly of FIG. 2 from a normal use condition to a crash condition, in accordance with an illustrative embodiment.
Figure 14B:
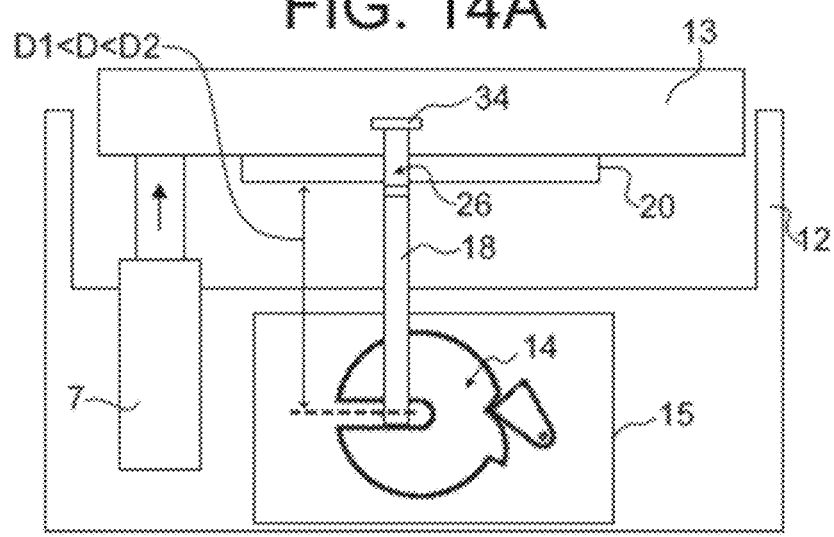
Figure 14C:
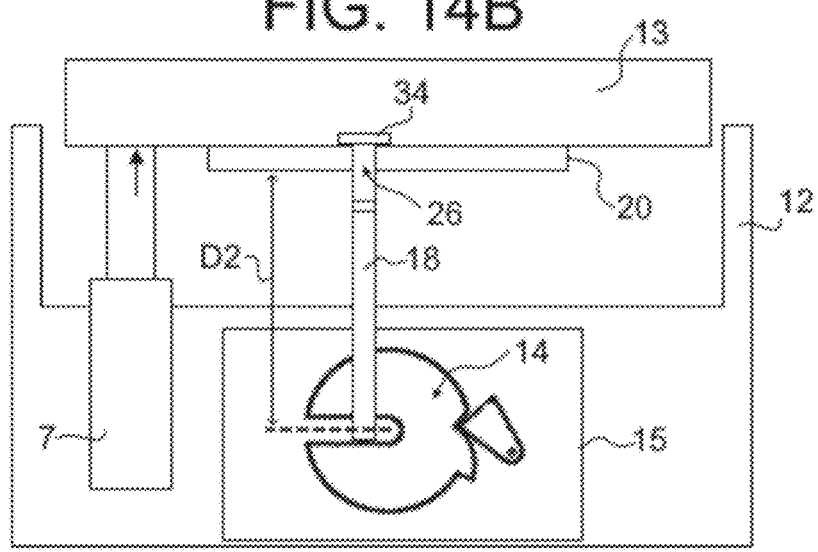

Referring additional to FIG. 14A to 14C, there is show any illustrative operation of the striker assembly transitioning from the normal use condition to the crash condition as part of a vehicle 11 having a vehicle body 12, the vehicle 11 having a closure member 13 coupled to the vehicle body 12, a latch assembly 15 coupled to one of the closure member 13 and the vehicle body 12, and a striker assembly 10 coupled to the other one of the vehicle closure panel 13 and the vehicle body 12, the striker assembly 10 having a striker 18 configured for latched engagement with a ratchet of the latch assembly 15, wherein the striker 18 has a normal use condition for maintaining the vehicle closure panel 13 in a normal position relative to the vehicle body (shown in FIG. 14A), and a crash condition for allowing the vehicle closure panel 13 to move away from the normal position relative to the vehicle body (shown in FIGS. 14B and 14C). An actuator 7 for applying an actuation force on the closure member 13 to move the closure member 13 away from the vehicle body 12 is shown, wherein applying the actuation force on the closure member 13 causes the striker assembly 10 to transition from the normal use condition to the crash condition. For example the striker 18 is allowed to expand and second end region 31 to move away from the striker plate 20. As can be seen between FIGS. 14A and 14C, the hood 13 has been moved out of a flushed alignment with the body 12 as an example. As can be seen in FIG. 14A to FIG. 14C, the ratchet 14 remains in a latched state throughout the transition of the striker assembly 20.

Figure 7:
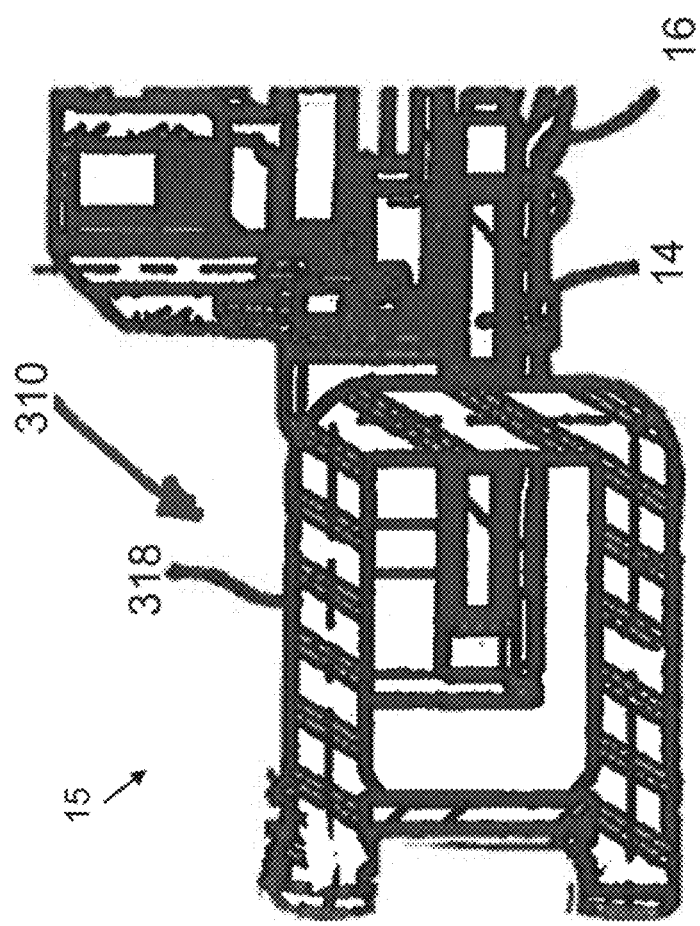
FIG. 7 is a cross-sectional view of a portion of a striker assembly and latch assembly of FIG. 1.

In FIG. 7, a striker assembly 310 constructed in accordance with another aspect of the disclosure is shown, wherein the same reference numerals, offset by a factor of 300, are used to identify at least some of the like features.

Striker assembly 310 is constructed having a decoupled, dampened striker arrangement, as discussed in more detail below, to provide a durable fixation of a striker 318 to vehicle body 12, while also minimizing the generation and proliferation of vibration and noise in use. Although striker assembly 310 is discussed in relation to front door 13, it is contemplated herein that striker assembly 310 could be used with any other closure panel of vehicle 11.

Figure 8:
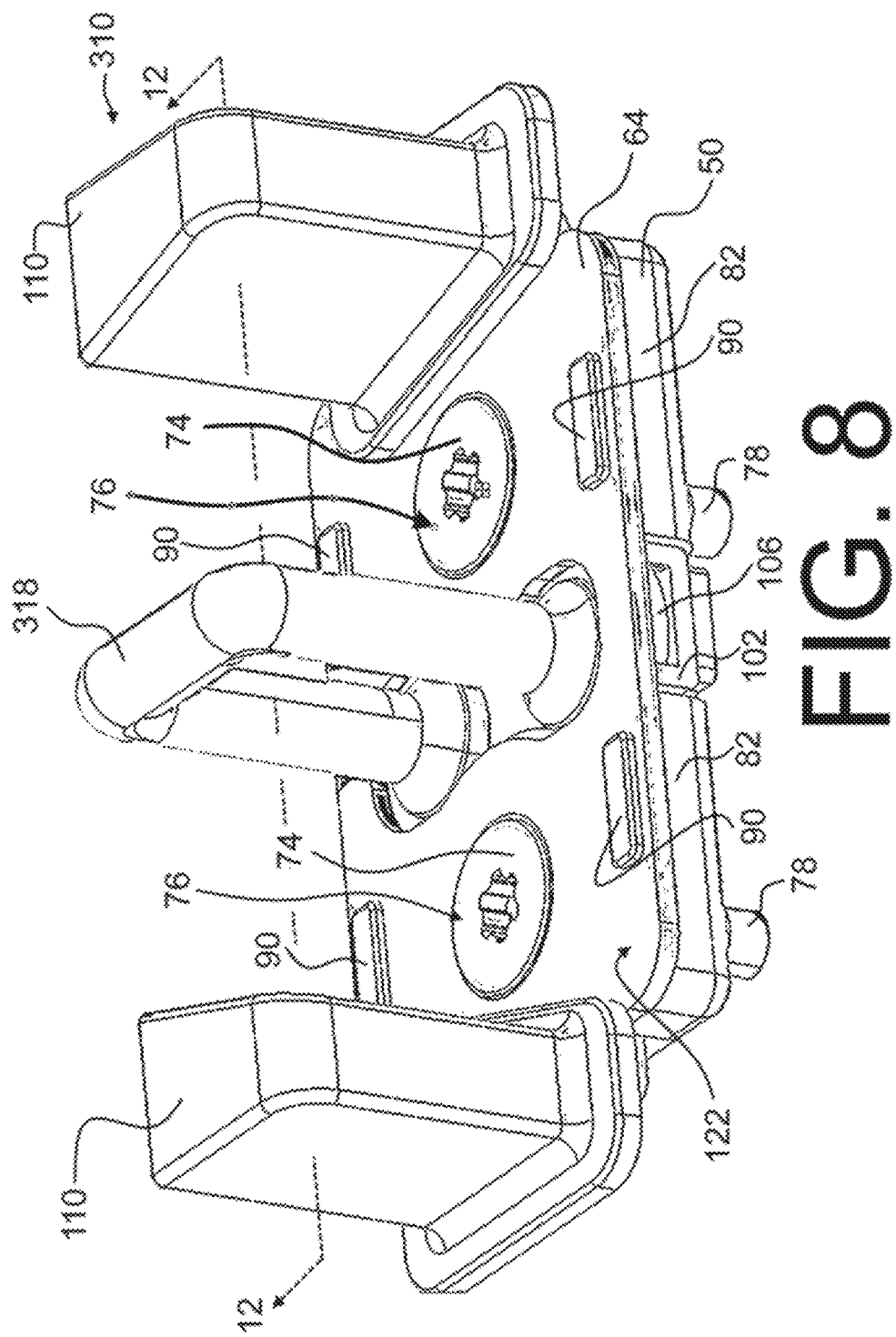
FIG. 8 is a perspective view of the striker assembly of FIG. 7.
Figure 9:
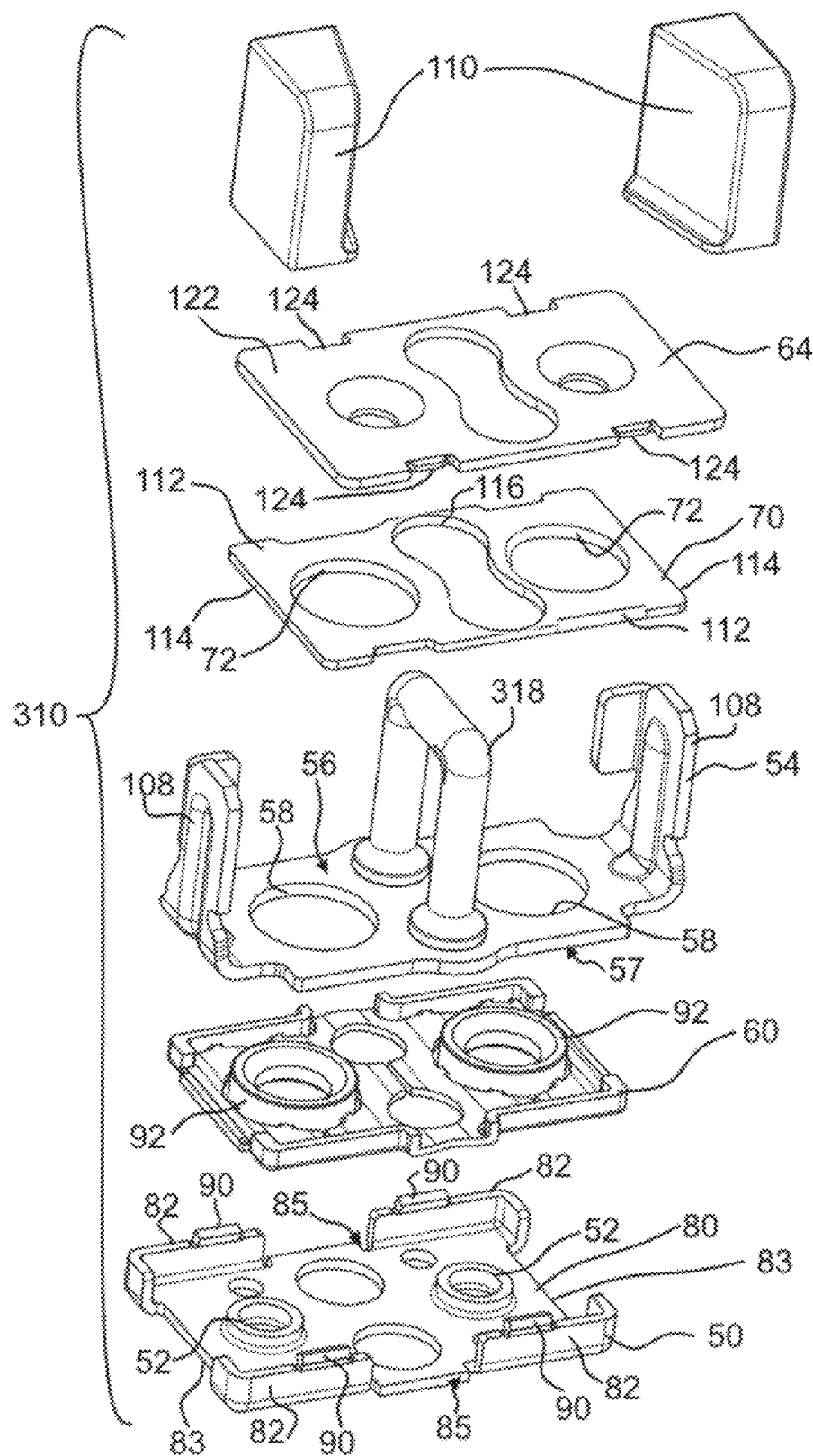
FIG. 9 is an exploded view of the striker assembly of FIG. 8.

Striker assembly 310, as best shown in FIGS. 8 and 9, includes a bottom, also referred to as base or base plate 50, having a plurality of base plate fastener openings 52; a striker plate 54 having a first side 56 and an opposite second side 57 with a plurality of striker plate fastener openings 58 extending therethrough, with the striker plate fastener openings 58 being axially aligned (along a common fastener axis A) and/or concentric with the base plate fastener openings 52. Further, striker 318 is fixed to the striker plate 54 and extends upwardly from the first side 56, shown as extending transversely from a generally planar surface of the first side 56 of striker plate 54. A first elastomeric dampener 60 is disposed between the base plate 50 and the second side 57 of the striker plate 54, with the first elastomeric dampener 60 having a plurality of first elastomeric dampener fastener openings 62 aligned along axis A with the base plate fastener openings 52. A cover, also referred to as top plate 64 (FIGS. 5A and 5B), has a plurality of top plate fastener openings 66 aligned along axis A with the base plate fastener openings 52, with the top plate fastener openings 66 being bounded by fastener seats 68. A second elastomeric dampener 70 is disposed between the top plate 64 and the first side 56 of the striker plate 54, with the second elastomeric dampener 70 having a plurality of second elastomeric dampener fastener openings 72 aligned along axis A with the base plate fastener openings 52. The fastener seats 68 of top plate 64 are configured to abut heads 74 of fasteners 76 having shanks 78 configured to extend through the axially aligned fastener openings, including the base plate fastener openings 52, the striker plate fastener openings 58, the first elastomeric dampener fastener openings 62, the top plate fastener openings 66, and the second elastomeric dampener fastener openings 72, with the shanks 78 being configured for operable attachment, such as via threaded engagement with, by way of example and without limitation, to one of the vehicle closure panel 13 or vehicle body structure 12 such that the striker 318 is retained against separation from the base plate 50 by a combined tensile strength of all the shanks 78 of the fasteners 76.

The base plate 50 is preferably made of metal, such as via a stamped metal plate, by way of example and without limitation. Base plate 50 is shown as having a bottom wall 80 and upstanding sidewalls 82, shown as four sidewalls spaced from one another by opposite end windows 83 and opposite side windows 85. Bottom wall 80, in addition to the base plate fastener openings 52, has a pair of bottom wall striker openings 88 through which ends of striker 318 can be received. Sidewalls 82 are shown as having a plurality of upstanding tabs 90 configured for fixation to top plate 64.

Figure 11:
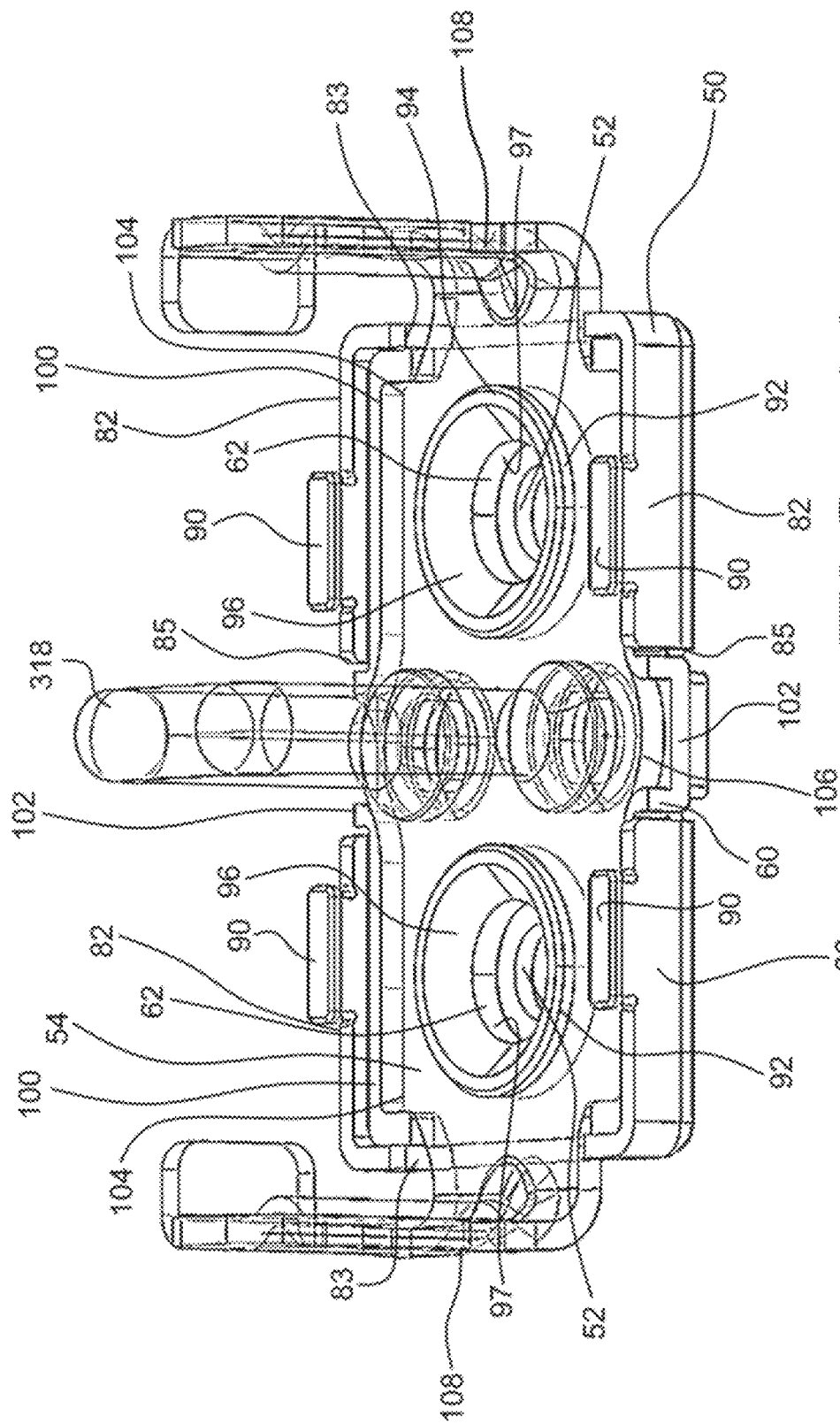
FIG. 11 is a partially assembled perspective view of the striker assembly of FIG. 7 shown with the top plate and a top dampener removed for clarity purposes only.
Figure 12:
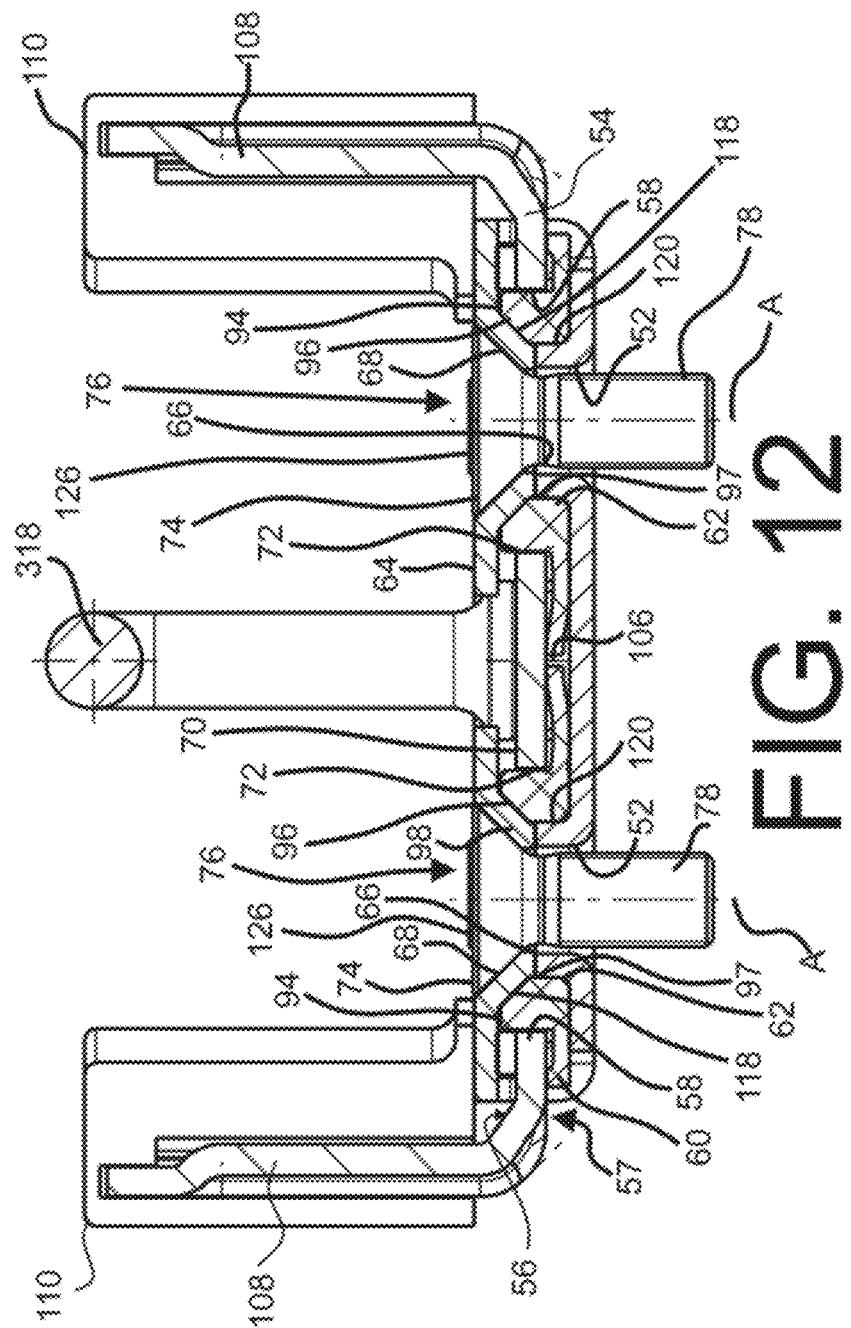
FIG. 12 is a cross-sectional view of the striker assembly taken generally along line 12-12 of FIG. 8.

At least one of the first elastomeric dampener 60 and the second elastomeric dampener 70, and shown here, by way of example and without limitation as the first elastomeric dampener 60, has a plurality of annular bosses 92 that extend upwardly from a generally planar surface, with the bosses 92 being configured to extend through the striker plate fastener openings 58 to enhance the overall dampening of striker assembly 310 and to prevent the shanks 78 of fasteners 76 from contacting the striker plate 54. Annular bosses 92 are best shown in FIG. 11 as extending upwardly from striker plate 54 to a peak, also referred to as free end 94, wherein free end 94 is shown engaging an underside of top plate 64 (FIG. 12) to dampen the top plate 64 against vibration, thereby further enhancing the dampening of striker assembly

310. Annular bosses 92 have tapered inner surfaces 96 that bound at least a portion of the first elastomeric dampener fastener openings 62, wherein tapered inner surfaces 96 are generally frustoconical to mate with annular protrusions 98 (FIG. 10B) of top plate 64 to further enhance dampening of top plate 64 and striker assembly 310. Tapered inner surfaces 96 are shown converging to cylindrical inner surfaces 97 that bound a remaining portion of the first elastomeric dampener fastener openings 62. As best seen in FIG. 11, first elastomeric dampener 60 has upstanding sidewalls 100 configured to extend in a close, line-to-line fit along sidewalls 82, and further includes oppositely facing projections, also referred to as ears 102 extending laterally outwardly from sidewalls 100 for a close-fit reception in side windows 85 of base plate 50.

The striker plate 54 is disposed over first elastomeric dampener 60 into engagement therewith, with annular bosses 92 extending upwardly through striker plate fastener openings 58. Striker plate 54 has opposite sides 104 configured for a close fit, such as line-to-line or slightly loose fit, along sidewalls 100, and also has projections, also referred to as ears 106 sized for receipt within ears 102 of first elastomeric dampener 60, thereby acting to stabilize striker plate 54 against lateral, twisting movement. Striker plate 54 has a pair of bumper support arms 108 extending upwardly, shown as generally transversely, from a generally planar surface of first side 56 of striker plate 54. A lowermost portion of bumper support arms 108 is shown as being received within end windows 83 formed within sidewalls 100 of base plate 20. Bumper support arms 108 act to fix and locate damper bumpers 110 disposed thereon.

As best shown in FIG. 9, the second elastomeric dampener 70 is shown as being generally flat, also referred to as planar, having a shape bounded by opposite sides 112 and opposite ends 114 sized for a close fit within sidewalls 82 of base plate 50. Second elastomeric dampener 70 has a striker opening 116 sized for receipt of striker 318 therethrough.

Figure 10A:
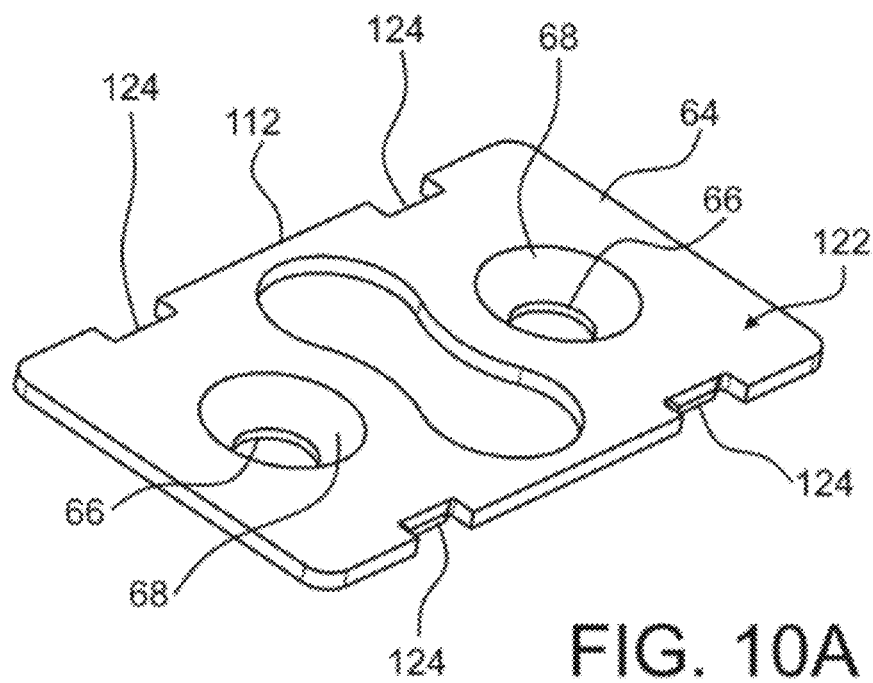
FIGS. 10A and 10B illustrate opposite side perspective views of a top plate of the striker assembly of FIG. 7.
Figure 10B:
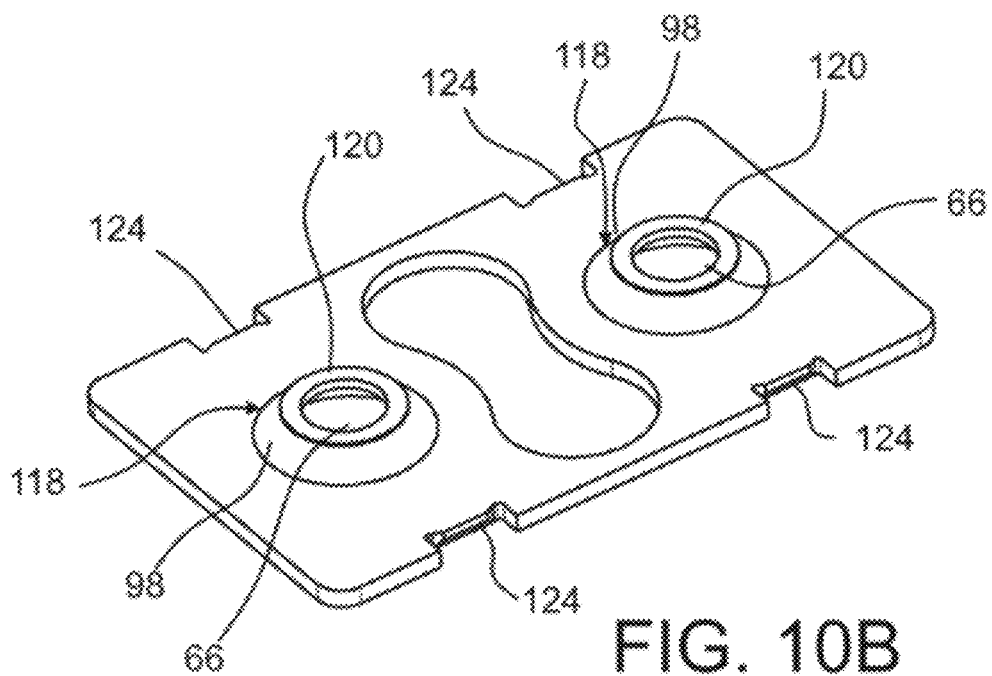

As best seen in FIG. 10B, the annular protrusions 98 of top plate 64 have tapered outer surfaces 118 configured to mate with the tapered inner surfaces 96 of the annular bosses 92, wherein the tapered outer surfaces 118 are shown as being frustoconical. Annular protrusions 98 further include cylindrical outer surfaces 120 configured for close receipt along cylindrical inner surfaces 97 of first elastomeric dampener fastener openings 62. Top plate 64 has countersunk surfaces forming fastener seats 68 opposite the tapered outer surfaces 118 of the annular protrusions 98, with the countersunk surfaces 68 being configured to receive the heads 74 of the fasteners 76 therein such that the heads 74 are flush or recessed from a planar outwardly facing surface 122 of top plate 64. Top plate 64 has a plurality of through openings 124 configured for receipt of tabs 90 of base plate 50 therethrough, wherein tabs 90 are fixed in and against removal from the through openings 124. Tabs 90 can be fixed via any suitable fastening mechanism, such as heading or swaging, though other mechanisms are contemplated herein, such as adhesives, weld joints, fasteners, and the like.

Figure 13:
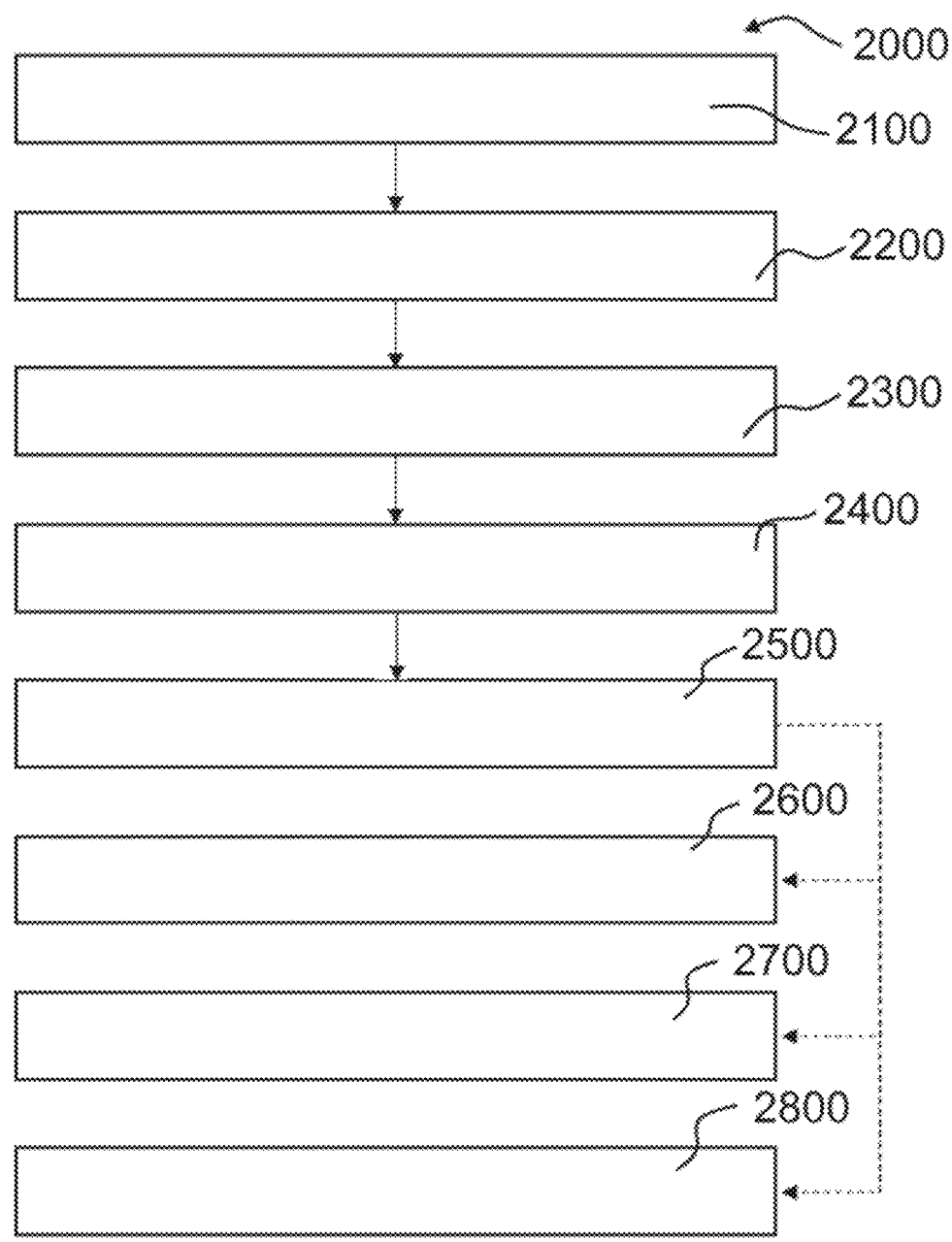
FIG. 13 is a flow diagram illustrating a method of constructing a striker assembly in accordance with another aspect of the disclosure.

In accordance with another aspect of the disclosure, as diagrammed in FIG. 13, a method 2000 for constructing a striker assembly 310 of a motor vehicle closure panel 13 is provided. The method 2000 includes a step 2100 of providing a base plate 50 having a plurality of base plate fastener openings 52; a step 2200 of providing a holding plate, also referred to as striker plate 54, having a striker 318 fixed thereto and having a plurality of striker plate fastener openings 58; a step 2300 of disposing a first elastomeric dampener 50 having a plurality of first elastomeric dampener fastener openings 62 between the base plate 50 and the striker plate 54 with the first elastomeric dampener fastener openings 62 being axially and/or concentrically aligned with the base plate fastener openings 52 and the striker plate fastener openings 58; a step 2400 of disposing a second elastomeric dampener 70 having a plurality of second elastomeric dampener fastener openings 72 over the striker plate 54 with the second elastomeric dampener fastener openings 72 being aligned with the base plate fastener openings 52; and a step 2500 of providing a top plate 64 having a plurality of top plate fastener openings 66 bounded by fastener seats 68 and disposing the top plate 64 over the second elastomeric dampener 70 such that the second elastomeric dampener 70 is sandwiched between the striker plate 54 and the top plate 64 and configuring the fastener seats 68 to engage heads 74 of fasteners 76 upon fixing the striker assembly 310 to one of the motor vehicle closure panel 13 and a vehicle body structure 12 via shanks 78 of the fasteners 76 such that the striker 318 is retained against separation from the base plate 50 by a tensile strength of the shanks 78 of the fasteners 76.

In accordance with another aspect of the disclosure, the method 2000 can further include a step 2600 of bringing annular protrusions 98 of the top plate 64, encircling the top plate fastener openings 66, into dampened engagement with the first elastomeric dampener 60 and the second elastomeric dampener 70.

In accordance with another aspect of the disclosure, the method 2000 can further include a step 2700 of bringing the annular protrusions 98 of the top plate 54 into dampened engagement with annular bosses 92 of the first elastomeric dampener 60.

In accordance with another aspect of the disclosure, the method 2000 can further include a step 2800 of extending the annular bosses 92 of the first elastomeric dampener 60 through the plurality of striker plate fastener openings 58 in the striker plate 54 and into engagement with the top plate 64.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A striker assembly for a vehicle closure panel of a vehicle having a vehicle body, the striker assembly comprising:
    a striker for coupling to one of the vehicle closure panel and the vehicle body and configured for latched engagement with a ratchet of a latch assembly provided on the other one of the vehicle closure panel and the vehicle body, wherein the striker has a normal use condition for maintaining the vehicle closure panel in a normal position relative to the vehicle body when in latched engagement with the ratchet, and a crash condition, whereat the entire striker is intentionally moved relative to said one of the vehicle closure panel and the vehicle body to which the striker is configured to be coupled, for allowing the vehicle closure panel to move away from the normal position relative to the vehicle body when in latched engagement with the ratchet;

a striker plate having opposite sides with at least one opening extending through said opposite sides;

the striker having a striker body extending through said at least one opening, said striker body extending outwardly from one of said opposite sides to a first end region and outwardly from the other of said opposite sides to a second end region configured for latched engagement with the ratchet of the latch assembly, said striker body being releasably fixed in a first position relative to said striker plate during the normal use condition whereat said striker maintains the vehicle closure panel in generally flush relation with an adjacent vehicle body structure while the ratchet is in a striker capture position and being automatically moveable relative to the striker plate to a second position during the crash condition to allow the vehicle closure panel to move outwardly from flush relation with the adjacent vehicle body structure, wherein material fixed to said striker body is intentionally deformable in the crash condition to allow said striker body to move automatically relative to said striker plate from said first position to said second position;

wherein said material fixed to said striker body provides bulbous regions confronting said opposite sides of said striker plate to maintain said striker body in said first position during normal use conditions, wherein at least one of said bulbous regions is intentionally deformable in the crash condition to allow said striker body to automatically move to said second position.

2. The striker assembly of claim 1, wherein the bulbous regions deform in response to a loading applied to the striker assembly above a predetermined loading value during the crash condition to promote the striker being intentionally moved relative to said one of the vehicle closure panel and the vehicle body to which the striker is configured to be coupled.

3. The striker assembly of claim 1, wherein the striker in the normal use condition maintains the vehicle closure panel a first distance from the vehicle body and the striker in the crash condition allows the vehicle closure panel to move to a second distance away from the vehicle body.

4. The striker assembly of claim 1, wherein the striker body is configured to intentionally slide through said at least one opening when the striker is in the crash condition.

5. The striker assembly of claim 1, wherein said at least one of said bulbous regions is intentionally deformable in shear.

6. The striker assembly of claim 1, wherein said vehicle closure panel is a front hood of the vehicle.

7. The striker assembly of claim 1, further comprising a striker plate having a first side and an opposite second side, the striker plate having at least one opening, the striker including a body portion extending through each at least one opening and outwardly from each of the first and second side, wherein the body portion extending from the first side is adapted for engagement with the ratchet and the body portion extending from the second side includes a retainer member that is spaced apart from the secondary side when the striker is in the normal use condition and that is in abutment with the second side in the crash condition.

8. A striker assembly for a vehicle closure panel of a vehicle having a vehicle body, the striker assembly comprising:

a striker for coupling to one of the vehicle closure panel and the vehicle body and configured for latched engagement with a ratchet of a latch assembly provided on the other one of the vehicle closure panel and the vehicle body, wherein the striker has a normal use condition for maintaining the vehicle closure panel in a normal position relative to the vehicle body when in latched engagement with the ratchet, and a crash condition, whereat the entire striker is intentionally moved relative to said one of the vehicle closure panel and the vehicle body to which the striker is configured to be coupled, for allowing the vehicle closure panel to move away from the normal position relative to the vehicle body when in latched engagement with the ratchet;

a striker plate having opposite sides with at least one opening extending through said opposite sides;

the striker having a striker body extending through said at least one opening, said striker body extending outwardly from one of said opposite sides to a first end region and outwardly from the other of said opposite sides to a second end region configured for latched engagement with the ratchet of the latch assembly, said striker body being releasably fixed in a first position relative to said striker plate during the normal use condition whereat said striker maintains the vehicle closure panel in generally flush relation with an adjacent vehicle body structure while the ratchet is in a striker capture position and being automatically moveable relative to the striker plate to a second position during the crash condition to allow the vehicle closure panel to move outwardly from flush relation with the adjacent vehicle body structure, wherein material fixed to said striker body is intentionally deformable in the crash condition to allow said striker body to move automatically relative to said striker plate from said first position to said second position;

wherein said material fixed to said striker body provides bulbous regions confronting said opposite sides of said striker plate to maintain said striker body in said first position during normal use conditions, wherein said material fixed to said striker body is formed as a monolithic piece of material with said body.

9. A striker assembly for a vehicle closure panel of a vehicle having a vehicle body, the striker assembly comprising:

a striker for coupling to one of the vehicle closure panel and the vehicle body and configured for latched engagement with a ratchet of a latch assembly provided on the other one of the vehicle closure panel and the vehicle body, wherein the striker has a normal use condition for maintaining the vehicle closure panel in a normal position relative to the vehicle body when in latched engagement with the ratchet, and a crash condition, whereat the entire striker is intentionally moved relative to said one of the vehicle closure panel and the vehicle body to which the striker is configured to be coupled, for allowing the vehicle closure panel to move away from the normal position relative to the vehicle body when in latched engagement with the ratchet;

a striker plate having opposite sides with at least one opening extending through said opposite sides;

the striker having a striker body extending through said at least one opening, said striker body extending outwardly from one of said opposite sides to a first end region and outwardly from the other of said opposite sides to a second end region configured for latched engagement with the ratchet of the latch assembly, said striker body being releasably fixed in a first position relative to said striker plate during the normal use condition whereat said striker maintains the vehicle closure panel in generally flush relation with an adjacent vehicle body structure while the ratchet is in a striker capture position and being automatically moveable relative to the striker plate to a second position during the crash condition to allow the vehicle closure panel to move outwardly from flush relation with the adjacent vehicle body structure, wherein material fixed to said striker body is intentionally deformable in the crash condition to allow said striker body to move automatically relative to said striker plate from said first position to said second position;

wherein said material fixed to said striker body provides bulbous regions confronting said opposite sides of said striker plate to maintain said striker body in said first position during normal use conditions, further comprising a retainer member fixed to said striker body adjacent said first end region in axially spaced relation from said bulbous regions, said retainer region being enlarged relative to said at least one opening so as to not fit through said at least opening during normal use and in a crash condition.

10. The striker assembly of claim 9, wherein said retainer member is formed as a monolithic piece of material with said striker body.

11. The striker assembly of claim 9, wherein said retainer member is formed as a separate piece of material from said striker body.

12. The striker assembly of claim 11, wherein said retainer member is an annular washer.

13. A method of constructing a striker assembly for use with a latch assembly of a motor vehicle closure panel, comprising:

providing a striker;

providing a striker plate having opposite sides with at least one opening extending through the opposite sides;

extending a body of the striker through the at least one opening such that the body extends outwardly from one of the opposite sides to a first end region and outwardly from the other of the opposite sides to a second end region configured for latched engagement with a ratchet of a latch assembly;

attaching the body in a first position relative to the striker plate so that the body remains releasably fixed in the first position during normal use conditions whereat the striker maintains the vehicle closure panel in generally flush relation with an adjacent vehicle body structure while the ratchet is in a striker capture position, and so that the body is automatically moveable to a second position relative to the striker plate during a crash condition to allow the vehicle closure panel to move outwardly from flush relation with the adjacent vehicle body structure;

wherein material fixed to the body is sized so as to be intentionally deformable in the crash condition to allow the body to move automatically from the first position to the second position; and wherein a retainer member fixed to the body is sized so as to prevent the body from moving past the second position;

wherein the material fixed to the body defines bulbous regions confronting the opposite sides of the striker plate to maintain the body in the first position during normal use conditions.

14. The method of claim 13, wherein at least one of the bulbous regions is intentionally deformable in the crash condition to deform and allow the body to automatically move to the second position.

15. The method of claim 14, wherein the at least one of the bulbous regions is intentionally deformable in shear.

16. The method of claim 13, further comprising: wherein with the body in the first position the retainer member, which is fixed to the body and moves with the body as the body moves relative to the striker plate, is spaced apart and out of abutment with the striker plate, and with the body in the second position the retainer member, which is fixed to the body and moves with the body as the body moves relative to the striker plate, is in abutment with the striker plate.

\* \* \* \* \*